(12) United States Patent
Ikeda

(10) Patent No.: US 10,824,380 B2
(45) Date of Patent: Nov. 3, 2020

(54) TERMINAL APPARATUS, COMMUNICATION SYSTEM, COMPUTER-READABLE RECORDING MEDIUM, AND DISPLAY CONTROL METHOD

(71) Applicant: SEIKO EPSON CORPORATION, Tokyo (JP)

(72) Inventor: Iwane Ikeda, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/286,381

(22) Filed: Feb. 26, 2019

(65) Prior Publication Data

US 2019/0265923 A1 Aug. 29, 2019

(30) Foreign Application Priority Data

Feb. 27, 2018 (JP) ................................. 2018-032856

(51) Int. Cl.
*G06F 3/12* (2006.01)
*H04N 1/00* (2006.01)
(Continued)

(52) U.S. Cl.
CPC .......... *G06F 3/1236* (2013.01); *G06F 3/1204* (2013.01); *G06F 3/1226* (2013.01);
(Continued)

(58) Field of Classification Search
CPC ........ G06F 3/12; G06F 3/1204; G06F 3/1222; G06F 3/126; G06F 3/1292;
(Continued)

(56) References Cited

U.S. PATENT DOCUMENTS 10,645,743 B2 * 5/2020 Ikeda ..................... H04W 4/023
2014/0092425 A1 * 4/2014 Park ....................... H04W 8/005
358/1.15

(Continued)

FOREIGN PATENT DOCUMENTS

EP 3098704 A 11/2016
JP 2015-200989 A 11/2015

OTHER PUBLICATIONS

European Search Report issued in Application No. EP19158996 dated Jun. 18, 2019.

*Primary Examiner* — Chad Dickerson
(74) *Attorney, Agent, or Firm* — Workman Nydegger

(57) ABSTRACT

A terminal apparatus includes a first wireless communication interface that performs wireless communication with an electronic apparatus using a first wireless communication scheme, a second wireless communication interface that performs wireless communication with the electronic apparatus using a second wireless communication scheme, and a processor. The first wireless communication interface searches for the electronic apparatus using the first wireless communication scheme, and the processor performs processing that displays on a display unit a display image which associates the electronic apparatus that is found as a result of the search which uses the first wireless communication scheme, and information that is acquired with a beacon signal which is received using the second wireless communication scheme.

15 Claims, 14 Drawing Sheets

| BEACON IDENTIFIER | IDENTIFICATION INFORMATION ON ELECTRONIC APPARATUS (MAC ADDRESS) | STATUS INFORMATION ON ELECTRONIC APPARATUS |
|---|---|---|

| IDENTIFICATION INFORMATION | NAME | RADIO WAVE STRENGTH INFORMATION | STATUS INFORMATION |
|---|---|---|---|
| MAC ADDRESS 1 | PRINTER 1 | — | — |
| MAC ADDRESS 2 | PRINTER 2 | STRONG | IDLE STATUS |
| MAC ADDRESS 3 | PRINTER 3 | STRONGEST | IDLE STATUS |
| MAC ADDRESS 4 | PRINTER 4 | MIDDLE | ERROR STATUS |
| MAC ADDRESS 5 | PRINTER 5 | — | — |
| MAC ADDRESS 6 | PRINTER 6 | WEAK | OPERATING STATUS |
| MAC ADDRESS 7 | PRINTER 7 | — | — |

(51) Int. Cl.
*H04W 8/00* (2009.01)
*H04W 76/10* (2018.01)

(52) U.S. Cl.
CPC ....... *G06F 3/1292* (2013.01); *H04N 1/00413* (2013.01); *H04N 1/00477* (2013.01); *H04W 8/005* (2013.01)

(58) Field of Classification Search
CPC .......... H04N 1/32053; H04N 1/32112; H04N 1/00106; H04N 1/00307; H04N 1/32101; H04W 84/12; H04W 4/80; H04W 4/02
USPC .............. 358/1.11–1.18; 455/41.1–41.3, 436
See application file for complete search history.

(56) References Cited

U.S. PATENT DOCUMENTS

| | | | |
|---|---|---|---|
| 2014/0098393 A1* | 4/2014 | Kim | G06F 3/1221 358/1.13 |
| 2015/0288832 A1 | 10/2015 | Naruse et al. | |
| 2016/0360477 A1 | 12/2016 | Saeki et al. | |
| 2017/0085694 A1* | 3/2017 | Shibao | H04W 8/005 |
| 2017/0104880 A1* | 4/2017 | Shibao | H04N 1/00307 |
| 2017/0123740 A1* | 5/2017 | Ito | H04N 1/00413 |
| 2018/0152589 A1* | 5/2018 | Matsuda | G06F 3/126 |

* cited by examiner

FIG. 6

| BEACON IDENTIFIER | IDENTIFICATION INFORMATION ON ELECTRONIC APPARATUS (MAC ADDRESS) | STATUS INFORMATION ON ELECTRONIC APPARATUS |
|---|---|---|

FIG. 7

| IDENTIFICATION INFORMATION | NAME | RADIO WAVE STRENGTH INFORMATION | STATUS INFORMATION |
|---|---|---|---|
| MAC ADDRESS 1 | PRINTER 1 | — | — |
| MAC ADDRESS 2 | PRINTER 2 | STRONG | IDLE STATUS |
| MAC ADDRESS 3 | PRINTER 3 | STRONGEST | IDLE STATUS |
| MAC ADDRESS 4 | PRINTER 4 | MIDDLE | ERROR STATUS |
| MAC ADDRESS 5 | PRINTER 5 | — | — |
| MAC ADDRESS 6 | PRINTER 6 | WEAK | OPERATING STATUS |
| MAC ADDRESS 7 | PRINTER 7 | — | — |

FIG. 13

| BEACON IDENTIFIER | IDENTIFICATION INFORMATION ON ELECTRONIC APPARATUS (MAC ADDRESS) | STATUS INFORMATION ON ELECTRONIC APPARATUS | SSID | PASSWORD |

FIG. 14

| BEACON IDENTIFIER | IDENTIFICATION INFORMATION ON ELECTRONIC APPARATUS (MAC ADDRESS) | STATUS INFORMATION ON ELECTRONIC APPARATUS | REFERENCE RADIO WAVE STRENGTH | ns
TERMINAL APPARATUS, COMMUNICATION SYSTEM, COMPUTER-READABLE RECORDING MEDIUM, AND DISPLAY CONTROL METHOD

BACKGROUND

1. Technical Field

The present invention relates to a terminal apparatus, a communication system, a computer-readable recording medium, a display control method, and the like.

2. Related Art

In the related art, terminal apparatuses each of which performs communication with an electronic apparatus using a wireless communication scheme such as a wireless LAN are known. The wireless LAN, for example, is for communication that complies with Wi-Fi (a registered trademark) standards. As this terminal apparatus, a smartphone or the like is considered that transmits print data to an electronic apparatus that is a printer, through wireless communication which complies with Wi-Fi standards.

Furthermore, a technique is also known that uses wireless communication in compliance with a different wireless communication scheme when a connection in compliance with a given wireless communication scheme is established. In JP-A-2015-200989, a portable terminal is disclosed that detects a printer which is at the most shortest distance using Bluetooth Low Energy (BLE) radio (Bluetooth is a registered trademark) wave strength and that transmits print data to the detected printer through a wireless LAN. Furthermore, in JP-A-2015-200989, it is also disclosed that the printer that is detected with BLE is list-displayed.

A terminal apparatus searches an electronic apparatus that is a connection target, by using a Wi-Fi function. It is understood that the electronic apparatus that is found a result of the search is available for Wi-Fi communication, but a distance to the terminal apparatus is not considered. In some cases, a user also selects a printer that is at a distant position, and there is a concern that the convenience will decrease when collecting printed matters.

With a technique in JP-A-2015-200989, the specification of an electronic apparatus that is at a short distance may be possible, or a display that results from considering a positional relationship to the terminal apparatus may be possible. However, in JP-A-2015-200989, Wi-Fi information when selecting and displaying an electronic apparatus is not considered. For this reason, there is a concern that an electronic apparatus will be present which possibly performs a job with Wi-Fi but is not recognized as such because of the absence of a BLE signal therefrom or that an electronic apparatus will be present which cannot perform a job with Wi-Fi but is a selection or display target because of a short distance that is determined by BLE. That is, with the technique in JP-A-2015-200989, it is difficult to set a suitable electronic apparatus to be a connection target.

SUMMARY

An advantage of some aspects of the invention is to provide a terminal apparatus, a communication system, a computer-readable recording medium, and a display control method, which are capable of establishing a wireless connection to a suitable electronic apparatus.

According to an aspect of the invention, there is provided a terminal apparatus including: a first wireless communication unit that performs wireless communication with an electronic apparatus using a first wireless communication scheme; a second wireless communication unit that performs wireless communication with the electronic apparatus using a second wireless communication scheme that is different from the first wireless communication scheme; and a processing unit that performs communication control of the first wireless communication unit and the second wireless communication unit, in which the first wireless communication unit searches for the electronic apparatus using the first wireless communication scheme, and in which the processing unit performs processing that displays on a display unit a display image in a display mode, which results from associating the electronic apparatus that is found as a result of the search which uses the first wireless communication scheme and information that is acquired with a beacon signal which is received using the second wireless communication scheme, with each other.

Furthermore, in the terminal apparatus, the first wireless communication unit may acquire first identification information on the electronic apparatus that is found as a result of the search which uses the first wireless communication scheme, the second wireless communication unit may receive the beacon signal that includes a second identification information on the electronic apparatus that is a transmission source, and, based on processing that collates the first identification information and the second identification information, the processing unit may perform processing that displays on the display unit the display image in the display mode, which results from associating the electronic apparatus that is found as a result of the search which uses the first wireless communication scheme and the information that is acquired with the beacon signal, with each other.

Furthermore, in the terminal apparatus, the information that is acquired with the beacon signal may be radio wave strength information on the beacon signal, and the processing unit may perform processing that displays on the display unit the display image in the display mode, which results from associating the electronic apparatus that is found as a result of the search which uses the first wireless communication scheme and the radio wave strength information on the beacon signal, with each other.

Furthermore, in the terminal apparatus, the information that is acquired with the beacon signal may be status information on the electronic apparatus that transmits the beacon signal, and the processing unit may perform processing that displays on the display unit the display image in the display mode, which results from associating the electronic apparatus that is found as a result of the search which uses the first wireless communication scheme and the status information, with each other.

Furthermore, in the terminal apparatus, the processing unit may perform processing that displays on the display unit the display image in the display mode, on which multiple electronic apparatuses that are found as a result of the search which uses the first wireless communication scheme are list-displayed.

Furthermore, in the terminal apparatus, the information that is acquired with the beacon signal may be at least one of radio wave strength information on the beacon signal and status information on the electronic apparatus that transmits the beacon signal, and the processing unit may perform processing that displays on the display unit the display image in the display mode, which results from associating at least one of a first object that indicates the radio wave strength information in an identifiable manner and a second object that indicates the status information in an identifiable manner, with each one of the multiple electronic apparatuses that are list-displayed.

Furthermore, in the terminal apparatus, the first wireless communication unit may establish a connection to the electronic apparatus using the first wireless communication scheme, and the processing unit may perform processing that transmits processing-target data to the electronic apparatus which establishes the connection, or processing that receives the processing-target data from the electronic apparatus which establishes the connection.

Furthermore, in the terminal apparatus, the first wireless communication unit may search a network, to which the terminal apparatus connects using the first wireless communication scheme, for the electronic apparatus.

Furthermore, in the terminal apparatus, the first wireless communication unit may receive a second beacon signal that is transmitted by the electronic apparatus using the first wireless communication scheme, and thus may search for the electronic apparatus.

Furthermore, in the terminal apparatus, the second wireless communication unit may acquire connection information that is used for the first wireless communication scheme, using the beacon signal in compliance with the second wireless communication scheme, and the first wireless communication unit may establish a connection to the electronic apparatus using the connection information.

According to another aspect of the invention, there is provided a communication system including: the terminal apparatus described above; and the electronic apparatus.

According to still another aspect of the invention, there is provided a computer-readable recording medium on which a program is recorded, the program causing a computer to function as: a first wireless communication unit that performs a wireless communication with an electronic apparatus using a first wireless communication scheme; a second wireless communication unit that performs wireless communication with the electronic apparatus using a second wireless communication scheme that is different from the first wireless communication scheme; and a processing unit that performs communication control of the first wireless communication unit and the second wireless communication unit, in which the first wireless communication unit searches for the electronic apparatus using the first wireless communication scheme, and in which the processing unit performs processing that displays on a display unit a display image in a display mode, which results from associating the electronic apparatus that is found as a result of the search which uses the first wireless communication scheme and information that is acquired with a beacon signal which is received using the second wireless communication scheme, with each other.

According to still another aspect of the invention, there is provided a display control method including: searching for an electronic apparatus through wireless communication that uses a first wireless communication scheme; receiving a beacon signal in compliance with a second wireless communication scheme that is different from the first wireless communication scheme from the electronic apparatus; and performing processing that displays on a display unit a display image in a display mode, which results from associating the electronic apparatus that is found as a result of the search which uses the first wireless communication scheme, and information that is acquired with the beacon signal which is received using the second wireless communication scheme, with each other.

BRIEF DESCRIPTION OF THE DRAWINGS

The invention will be described with reference to the accompanying drawings, wherein like numbers reference like elements.

FIG. 6 is a diagram illustrating an example of a data structure of a BLE beacon signal.

FIG. 7 is a diagram illustrating data that results from collation processing.

FIG. 13 is a diagram illustrating another example of the data structure of the BLE beacon signal.

FIG. 14 is a diagram illustrating another example of the data structure of the BLE beacon signal.

DESCRIPTION OF EXEMPLARY EMBODIMENTS

The present embodiment will be described below. It is noted that the present embodiment which will be described below does not improperly limit the subject matter of the invention that is claimed in a claim. Furthermore, all configurations that will be described in the present embodiment are not necessarily configurational requirements for the invention.

1. Example of a Configuration of a System

Figure 1:
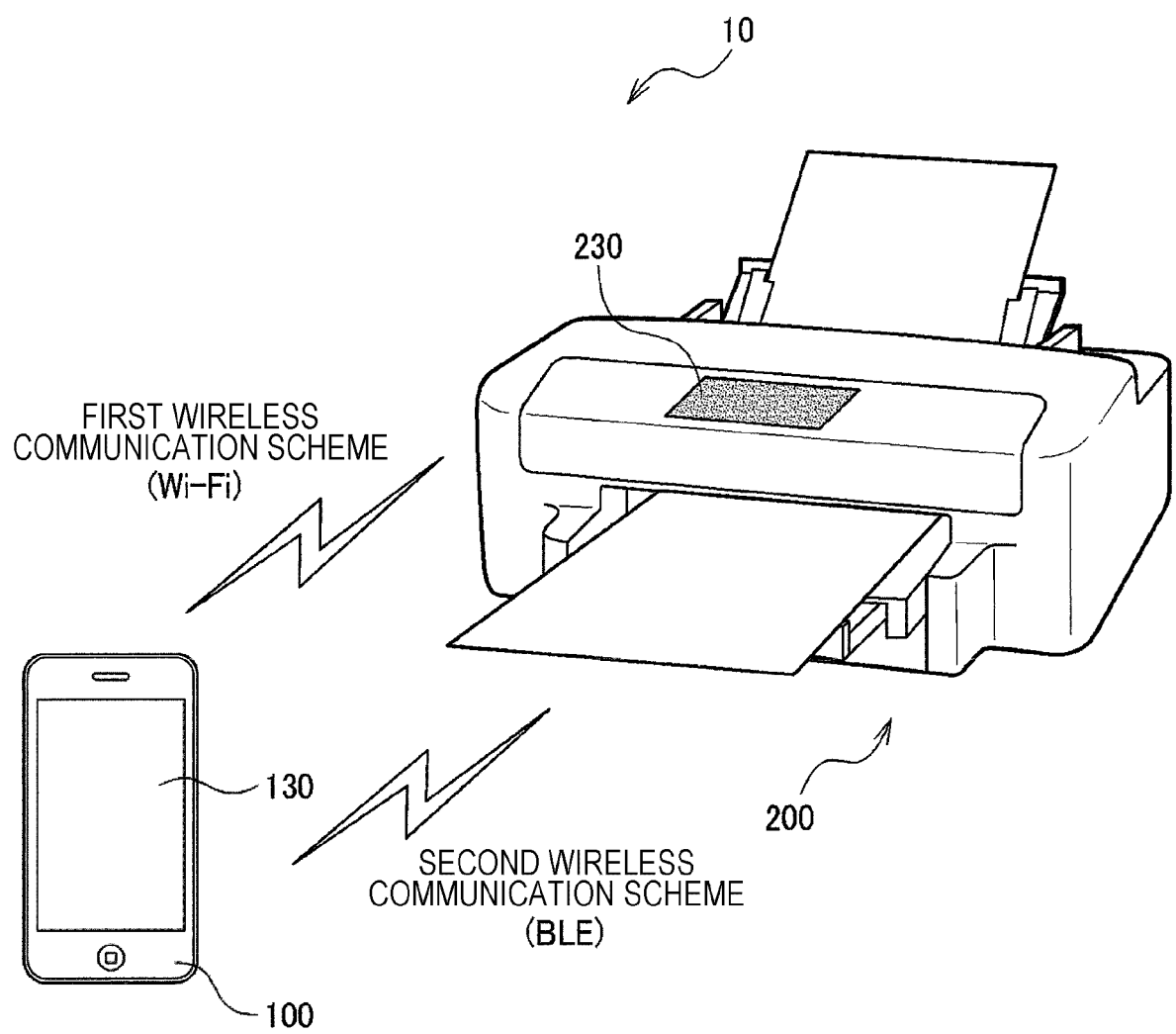
FIG. 1 is a diagram illustrating an example of a configuration of a communication system.

FIG. 1 is a diagram schematically illustrating an example of a terminal apparatus 100 and a communication system 10. The communication system 10 includes the terminal apparatus 100 and an electronic apparatus 200.

The terminal apparatus 100 is a portable terminal apparatus, such as a smartphone or a tablet terminal. However, the terminal apparatus 100 may be any other apparatus such as a personal computer (PC).

The electronic apparatus 200, for example, is a printer. Alternatively, the electronic apparatus 200 may be a scanner, a facsimile machine, or a copy machine. The electronic apparatus 200 may be a multifunction peripheral (MFP) that has multiple functions, and a multifunction peripheral that has a printing function is also an example of the printer. The electronic apparatus 200 according to the present embodiment is possibly searched for by the terminal apparatus 100 using a first wireless communication scheme, and examples of the electronic apparatus 200 include further any arbitrary apparatus that possibly transmits a beacon signal in compliance with a second wireless communication scheme. The electronic apparatus 200 may be a projector, a head-mounted display device, a wearable device, a biological information measuring instrument, such as a pulse meter or a physical activity meter, a robot, a video apparatus, such as a camera, a portable information terminal, such as a smartphone, a physical quantity measuring instrument, or the like.

As illustrated in FIG. 1, the terminal apparatus 100 and the electronic apparatus 200 possibly perform wireless communication in compliance with the first wireless communication scheme and wireless communication in compliance with the second wireless communication scheme.

From the perspective of standards, a communication speed and a communication-available distance are longer and higher, respectively, in the first wireless communication scheme than in the second wireless communication scheme. The first wireless communication scheme is a wireless LAN in a narrow sense, and, more specifically, Wi-Fi. An example will be described below in which the first wireless communication scheme is Wi-Fi, but it is possible that the first wireless communication scheme may be any other communication scheme.

Although not illustrated that is illustrated in FIG. 1, there are two configurations in which the terminal apparatus 100 makes a connection to the electronic apparatus 200 using the first wireless communication scheme. The terminal apparatus 100 may make a connection to the electronic apparatus 200 by way of any other apparatus such as a wireless LAN router, and makes a direct connection to the electronic apparatus 200. For example, in a case where the electronic apparatus 200 operates in an infrastructure mode and connects to a given external access point, the terminal apparatus 100 makes a wireless connection to the external access point, and thus communication is performed between the terminal apparatus 100 and the electronic apparatus 200. In this case, the connection between the electronic apparatus 200 and the external access point is not limited to the wireless connection and may be realized in a wired manner.

Alternatively, the electronic apparatus 200 activates an internal access point and the terminal apparatus 100 makes a connection to the internal access point, and thus communication is directly performed between the terminal apparatus 100 and the electronic apparatus 200. The direct connection between the terminal apparatus 100 and the electronic apparatus 200 may be made through communication in compliance with Wi-Fi Direct (WFD) standards, and may be performed in a Wi-Fi ad hoc mode.

It is noted that it is assumed that the electronic apparatus 200 according to the present embodiment is an apparatus that either makes a connection to the external access point or activates the internal access point. In other words, it is not assumed that one electronic apparatus 200 makes a connection to the external access point and activates the internal access point at the same time.

From the perspective of standards, a communication speed and a communication-available distance are lower and shorter, respectively, in the second wireless communication scheme than in the first wireless communication scheme, and possibly transmits the beacon signal. The second wireless communication scheme is Bluetooth in a narrow sense, and, more precisely, for BLE. An example will be described below in which the second wireless communication scheme refers to BLE, but it is possible that the first wireless communication scheme may be any other communication scheme. The beacon signal in compliance with BLE corresponds to an advertisement packet. It is noted that the transmission of the beacon signal is possible with the first wireless communication scheme without any constraint. If the first wireless communication scheme is Wi-Fi, the electronic apparatus 200 transmits a beacon signal that makes service set identifier (SSID) of its own known.

Figure 2:
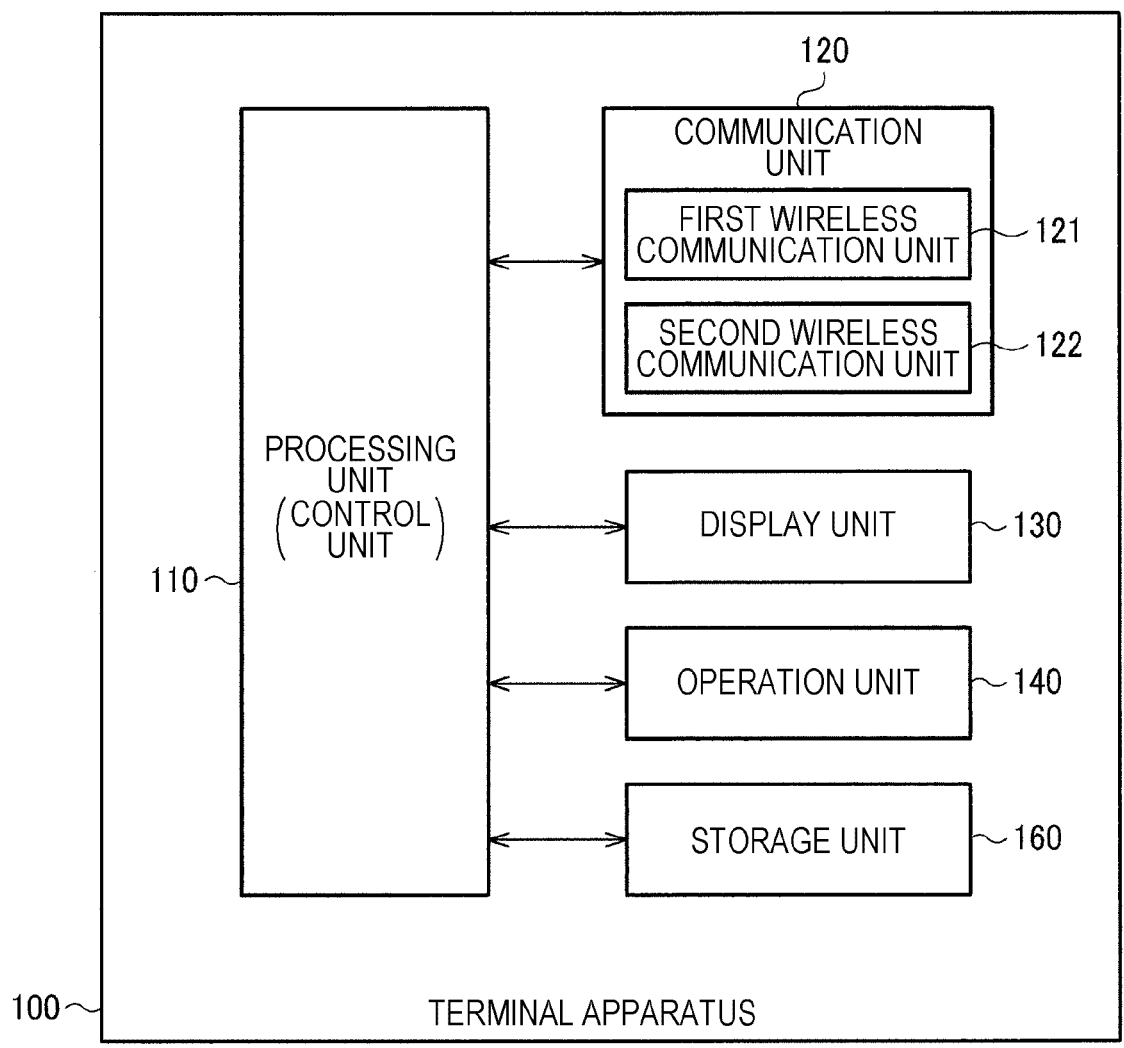
FIG. 2 is a diagram illustrating an example of a configuration of a terminal apparatus.

FIG. 2 is a block diagram illustrating an example of a configuration of the terminal apparatus 100. The terminal apparatus 100 includes a processing unit 110, a communication unit 120, a display unit 130, an operation unit 140, and a storage unit 160. For example, the processing unit 110 is a processor or a controller, the communication unit 120 is a communication interface, the display unit 130 is a display, the operation unit 140 is an operation button or the like, and the storage unit 160 is a storage device or a memory.

The processing unit 110 performs control of each of the communication unit 120, the display unit 130, the operation unit 140, and the storage unit 160.

Each processing operation and each function according to the present embodiment, which is performed by the processing unit 110, can be realized by a processor that includes hardware. For example, each processing operation according to the present embodiment can be realized by a processor that operates based on an information such a program, and a memory in which the program and the information are stored. The processor here, for example, may cause a function of each unit to be realized in individual hardware or may cause the function of each unit to be realized in integrated hardware. For example, the processor can include a piece of hardware, and the piece of hardware can include at least one of a circuit that processes a digital signal and a circuit that processes an analog signal. For example, the processor can be configured with one or multiple circuit devices that are mounted on a circuit substrate, or with one or multiple circuit elements. The circuit device here is an integrated circuit (IC), or the like, and the circuit element is a resistor, a capacitor, or the like. The processor, for example, may be a central processing unit (CPU). However, the processor is not limited to the CPU, and it is possible that various processors such as a graphics processing unit (GPU) and a digital signal processor (DSP) are used. Furthermore, the processor may be a hardware circuit such as an application specific integrated circuit (ASIC). Furthermore, the processor may be configured with multiple CPUs, and may be configured with hardware circuits such as multiple ASICs. Furthermore, the processor may be configured with a combination of multiple CPUs and hardware circuits such as multiple ASICs.

The communication unit 120 includes a first wireless communication unit 121 and a second wireless communication unit 122. The first wireless communication unit 121 is a wireless communication device that performs wireless communication that complies with Wi-Fi standards, and the second wireless communication unit 122 is a wireless communication device that performs wireless communication in compliance with BLE standards. Each wireless communication device, for example, is a wireless communication chip.

The display unit 130 is configured with a display on which various pieces of information are displayed for the user, and the like, and the operation unit 140 is configured with a button on which a user performs an input operation, and the like. It is noted that the display unit 130 and the operation unit 140 may be configured to be integrally combined into a touch panel.

The storage unit 160 (a storage device or a memory) stores various information including a data and a program. The processing unit 110 or the communication unit 120, for example, operates with the storage unit 160 as a working area. The storage unit 160 may be a semiconductor memory, such as a static random access memory (SRAM) or a dynamic random access memory (DRAM), may be a register, be a magnetic memory device such as a hard disk drive (HDD), and may be an optical storage device such as an optical disk.

Figure 3:
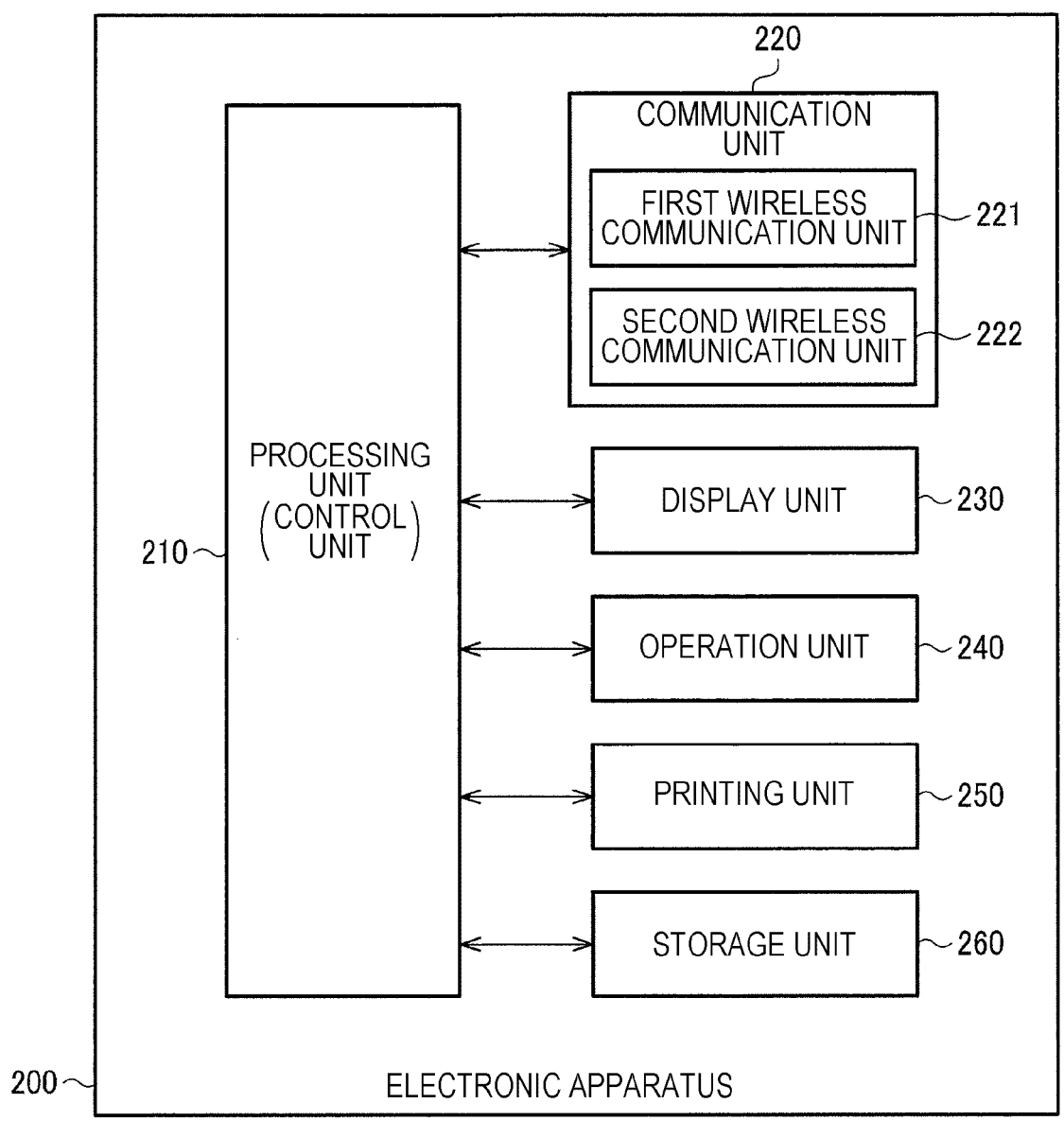
FIG. 3 is a diagram illustrating an example of a configuration of an electronic apparatus.

FIG. 3 is a block diagram illustrating an example of a configuration of the electronic apparatus 200. It is noted that FIG. 3 illustrates the electronic apparatus 200 that has a printing function and that an example where the electronic apparatus 200 is a printer will also be described below. However, as described above, examples of the electronic apparatus 200 further include apparatuses other than the printer. The electronic apparatus 200 includes a processing unit 210, a communication unit 220, a display unit 230, an operation unit 240, a printing unit 250, and a storage unit 260.

The processing unit 210 performs control of each of the units of the electronic apparatus 200. For example, the processing unit 210 can include multiple CPUs, such as a main CPU and a sub-CPU, or a micro-processing unit (MPU). The main CPU performs control of each of the units of the electronic apparatus 200 or overall control of the electronic apparatus 200. The sub-CPU performs various processing operations for printing, for example, in a case where the electronic apparatus 200 is a printer. Alternatively, a CPU for communication processing may be further provided.

The communication unit 220 includes a first wireless communication unit 221 and a second wireless communication unit 222. The first wireless communication unit 221 is a wireless communication device that performs wireless communication in compliance with Wi-Fi standards, and the second wireless communication unit 222 is a wireless communication device that performs wireless communication in compliance with BLE standards. The first wireless communication unit 221 makes a Wi-Fi connection to an external access point. Alternatively, the first wireless communication unit 221 activates an internal access point according to a given connection setting, and receives a connection request from the terminal apparatus 100. The connection setting is a setting of a service set identifier (SSID) or a passphrase, or is a setting of a communication frequency band.

The setting of the communication frequency band corresponds to a channel setting.

Furthermore, although not illustrated in FIG. 3, the communication unit 220 may include a third communication unit for making a connection to an external access point in a wired-connection manner. The communication unit 220, for example, is configured in such a manner that the first wireless communication unit 221 and the third communication unit are included and that effective or ineffective switching among first to third connection modes is possible. The first connection mode is a connection mode in which the first wireless communication unit 221 makes a wireless connection to the external access point. The second connection mode is a connection mode in which the first wireless communication unit 221 activates the internal access point. The third connection mode is a connection mode in which the third communication unit makes a wired connection to the external access point. Furthermore, a modification implementation in which one of the first wireless communication unit 221 and the third communication unit is omitted is also possible.

The display unit 230 is configured with a display on which various pieces of information are displayed for the user, and the like, and the operation unit 240 is configured with a button on which the user performs an input operation, and the like. It is noted that, for example, the display unit 230 and the operation unit 240 may be configured to be integrally combined into a touch panel.

The printing unit 250 includes a printing engine. The printing engine has a mechanical configuration in which printing of an image is performed on a printing medium. The printing engine, for example, includes a transportation mechanism, an ink jet type discharge head, and a driving mechanism for a carriage including the discharge head, and the like. The printing engine discharges ink from the discharge head onto the printing medium that is transmitted by the transportation mechanism, and thus prints an image on the printing medium. As the printing medium, various media can be used such as a paper sheet and a piece of cloth. It is noted that the specific configuration of the printing engine is not limited to that described here as an example, and may be one in which printing that uses toner is performed using an electrophotographic method.

The storage unit 260 (a storage device or a memory) stores various information including a data and a program. The processing unit 210 or the communication unit 220, for example, operates with the storage unit 260 as a working area. The storage unit 260 may be a semiconductor memory, may be a register, may be a magnetic memory device, and may be an optical storage device.

2. Technique According to the Present Embodiment

Next, a technique according to the present embodiment will be described. To begin with, an outline is described, and thereafter, a first embodiment and a second embodiment are described. A first embodiment corresponds to an example in which the terminal apparatus 100 and the electronic apparatus 200 are connected to each other through the external access point, and a second embodiment corresponds to an example in which the terminal apparatus 100 and the electronic apparatus 200 are directly connected to each other.

2.1 Outline

Because the terminal apparatus 100 transmits a large amount of print data at a high speed, it is considered that a Wi-Fi connection to a printer is made. Specifically, a print application that runs on an operating system (OS) of the terminal apparatus 100 performs processing that recognizes an operation of selecting a printer that is a connection target that uses Wi-Fi, or performs connection processing.

A Wi-Fi function of the terminal apparatus 100 is used for search and selection of a printer that is caused to perform printing. As will be described below with reference to FIG. 4, in a case where the terminal apparatus 100 is connected to the external access point 20, the terminal apparatus 100 transmits a response request packet, and, based on a response packet with which the electronic apparatus 200 replies, searches for a printer that is connected to the external access point 20. In a case where multiple printers are connected to the external access point 20, with search processing, the terminal apparatus 100 finds the multiple printers.

A user of the terminal apparatus 100 cannot determine which printer of the multiple printers that are found as a result of the search is nearby, in some cases, the user selects a remote printer. In a case where printing is performed in the printer, this causes a lack of the convenience when collecting printed matters.

Furthermore, identification information for specifying a printer is included in the response packet that is transmitted by way of the external access point 20, but status information on the printer is not included there. The terminal apparatus 100 establishes a Wi-Fi connection to a target printer, and then acquires information on the printer. For this reason, in some case, it is understood that, after the printer selection, the printer is in a state where print cannot be performed and there occurs a need to reselect the printer.

Furthermore, as will be described below with reference to FIG. 10, in a case where the terminal apparatus 100 and the electronic apparatus 200 are directly connected to each other, a printer that operates as an access point transmits a beacon signal for broadcasting an SSID of its own and the terminal apparatus 100 receives the beacon signal. Thus, a printer that is directly connectable is searched for. The beacon signal that complies with Wi-Fi standards is hereinafter expressed as a Wi-Fi beacon signal. Furthermore, in order to provide a distinction from the Wi-Fi beacon signal, a beacon signal that complies with BLE standards is expressed as a BLE beacon signal. Specifically, the Wi-Fi beacon signal is a signal for broadcasting an SSID, and the BLE beacon signal is an advertisement packet.

In this case, it is possible that, based on a reception radio wave strength of the Wi-Fi beacon signal, the processing unit 110 of the terminal apparatus 100 measures a distance between the terminal apparatus 100 and the electronic apparatus 200. However, because information for distance calculation, such as the BLE beacon signal, is not included in the Wi-Fi beacon signal, the precision of the distance measurement is low and there remains a concern that a remote printer will be selected. Furthermore, when a Wi-Fi connection is not established, status information on the electronic apparatus 200 is not acquired as is the case in FIG. 4, and in some cases, there occurs a need to reselect a printer.

A technique in JP-A-2015-200989 may be possible in which the electronic apparatus 200 at a short distance is specified using BLE or in which display is performed considering a positional relation to the terminal apparatus 100. However, in JP-A-2015-200989, Wi-Fi information is not considered when an apparatus that is a printing target is selected or displayed. For this reason, the electronic apparatus 200 that does not receive a BLE signal, although it possibly performs a job with a Wi-Fi connection, is selected and thus is not included in display targets. Furthermore, if a distance that is determined with BLE is short, the electronic apparatus 200 that is unable to perform a job with the Wi-Fi connection is selected and thus is a display target.

The terminal apparatus 100 according to the present embodiment, as illustrated in FIG. 2 includes the first wireless communication unit 121 that performs wireless communication with the electronic apparatus 200 using the first wireless communication scheme, the second wireless communication unit 122 that performs wireless communication with the electronic apparatus 200 using the second wireless communication scheme that is different from the first wireless communication scheme, and the processing unit 110 that performs communication control of the first wireless communication unit 121 and the second wireless communication unit 122.

Then, the first wireless communication unit 121 searches for the electronic apparatus 200 through wireless communication in compliance with the first wireless communication scheme. The search here is a search for the electronic apparatus 200 that is connectable by the terminal apparatus 100 with the first wireless communication scheme. The search is realized processing that receives the response request packet as a response to the response request packet that is transmitted, or processing that receives the Wi-Fi beacon signal that includes an SSID. The processing unit 110 performs processing that displays on the display unit a display image in a display mode, which results from associating the electronic apparatus 200 that is found as a result of the search that uses the first wireless communication scheme, and information that is acquired by the beacon signal which is received using the second wireless communication scheme, in a state of being associated with each other.

It is noted that an example in which a display image is displayed on the display unit 130 of the terminal apparatus 100. That is, the processing unit 110 performs processing that generates the display image in the display mode, which results from associating the electronic apparatus 200 that is found as a result of the search that uses the first wireless communication scheme, and information that is acquired by the beacon signal which is received using the second wireless communication scheme, in the state of being associated with each other, and that displays the generated display screen on the display unit 130 of its own. However, the display unit is not limited to the display unit 130 of the terminal apparatus 100. For example, the processing unit 110 of the terminal apparatus 100 may performs processing that displays the display image on the display unit 230 of the electronic apparatus 200 or a display unit of a different apparatus. The "processing for displaying" in this case is processing that transmits the display image, processing that transmits information which provides an instruction for display, or the like. Furthermore, the "processing for displaying" is processing that transmits information for generating the display image, for example, information that results from association, as will be described below with reference to FIG. 7, and the processing that generates the display image may be performed in an apparatus that has a display unit.

The electronic apparatus 200 that is found as a result of the search that uses Wi-Fi is set to be a display target, and thus the terminal apparatus 100 can set the apparatus that is connectable using Wi-Fi, to be a display target. Moreover, in the present embodiment, information that is acquired based on BLE is displayed in a state of being associated with the electronic apparatus 200 that is founded as a result of the search that uses Wi-Fi. Because an area where contents that are possibly freely determined by a user is present in the advertisement packet that is the BLE beacon signal, it is possible that additional information that cannot be acquired with the response packet that results when a Wi-Fi search is conducted, or with the Wi-Fi beacon signal is displayed. For example, when a target that performs a job is selected, useful information can be displayed as is the case with a display which shows the electronic apparatus 200 that is at a short distance from the terminal apparatus 100 and from which printing matters are easy to collect, a display which shows the electronic apparatus 200 that is in an idle state and thus can start to print immediately, and so on. That is, with the technique according to the present embodiment, in the terminal apparatus 100 that uses multiple different wireless communication schemes, the display image in a greatly convenient mode that compositely uses information in compliance with the multiple wireless communication schemes can be displayed.

It is noted, as described above, the first wireless communication unit 121 establishes a connection to the electronic apparatus 200 using the first wireless communication scheme and that the processing unit 110 performs processing which transmits processing-target data to the electronic apparatus 200 that establishes the connection or processing which receives processing-target from the electronic apparatus 200 that establishes the connection.

The processing that transmits the processing-target data is processing that transmits print data to the electronic apparatus 200 that is a printer, or the like. The processing that receives the processing-target data is processing that receives scan data from the electronic apparatus 200 that is a printer, or the like. In other words, in a case where the processing-target data is data that is used for the electronic apparatus 200 to perform a job, the processing-target data is transmitted from the terminal apparatus 100 to the electronic apparatus 200. On the other hand, in a case where the processing-target data is data that is generated by the electronic apparatus 200 performing a job, the processing-target data is transmitted by the electronic apparatus 200 and is received by the terminal apparatus 100. In this manner, in the present embodiment, the transmission and reception of the processing-target data are performed using the first wireless communication scheme in which a communication speed is relatively high, and the second wireless communication scheme is supplementally used to smoothly transmission and reception of data.

2.2 First Embodiment

Figure 4:
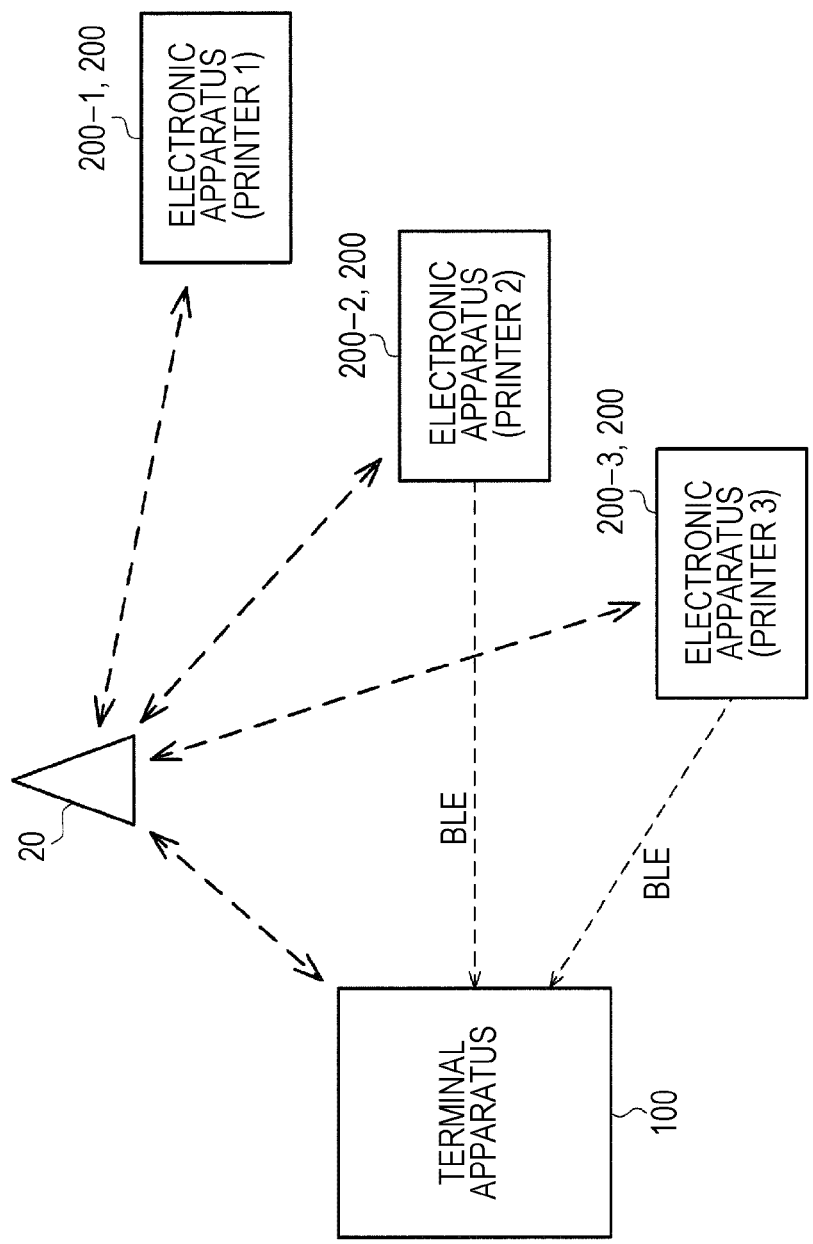
FIG. 4 is a diagram illustrating an example of a configuration of a communication system according to a first embodiment.

FIG. 4 illustrates a specific example of a system according to a first embodiment. As illustrated in FIG. 4, the terminal apparatus 100 and multiple electronic apparatuses 200 make connections to the external access point 20 using a Wi-Fi infrastructure mode. In FIG. 4, as the multiple electronic apparatuses 200, three electronic apparatuses, that is, electronic apparatuses 200-1 to 200-3 are illustrated. The electronic apparatus 200-1, the electronic apparatus 200-2, and the electronic apparatus 200-3 are hereinafter expressed as a printer 1, a printer 2, and a printer 3, respectively, for convenience of description. The external access point 20 and the printers 1 to 3 may be connected to each other through a router over a wired LAN.

The electronic apparatus 200 according to the present embodiment transmits an advertisement packet that is beacon signal that complies with the second wireless communication scheme, that is, a BLE beacon signal. In FIG. 4, an example is illustrated in which the second wireless communication unit 122 of the terminal apparatus 100 can receive BLE beacon signals of the printer 2 and the printer 3 that are at a nearby location, but cannot receive a BLE beacon signal of the printer 1 that is at a distant location.

In a case where the first wireless communication unit 121 of the terminal apparatus 100 operates in the infrastructure mode, the first wireless communication unit 121 searches a network, to which the terminal apparatus 100 connects, for the electronic apparatus 200, using the first wireless communication scheme.

In the case of an example in FIG. 4, the network that is a search target is a network that is formed by the external access point 20. The first wireless communication unit 121 of the terminal apparatus 100 transmits the response request packet that designates a broadcast address or a link local multicast address. The response request packet is a packet that requests an apparatus that receives the response request packet, to reply with a response packet that includes identification information on the apparatus. In FIG. 4, each of the printers 1 to 3 replies to the terminal apparatus 100 with a response packet that includes identification information on its own.

Figure 5:
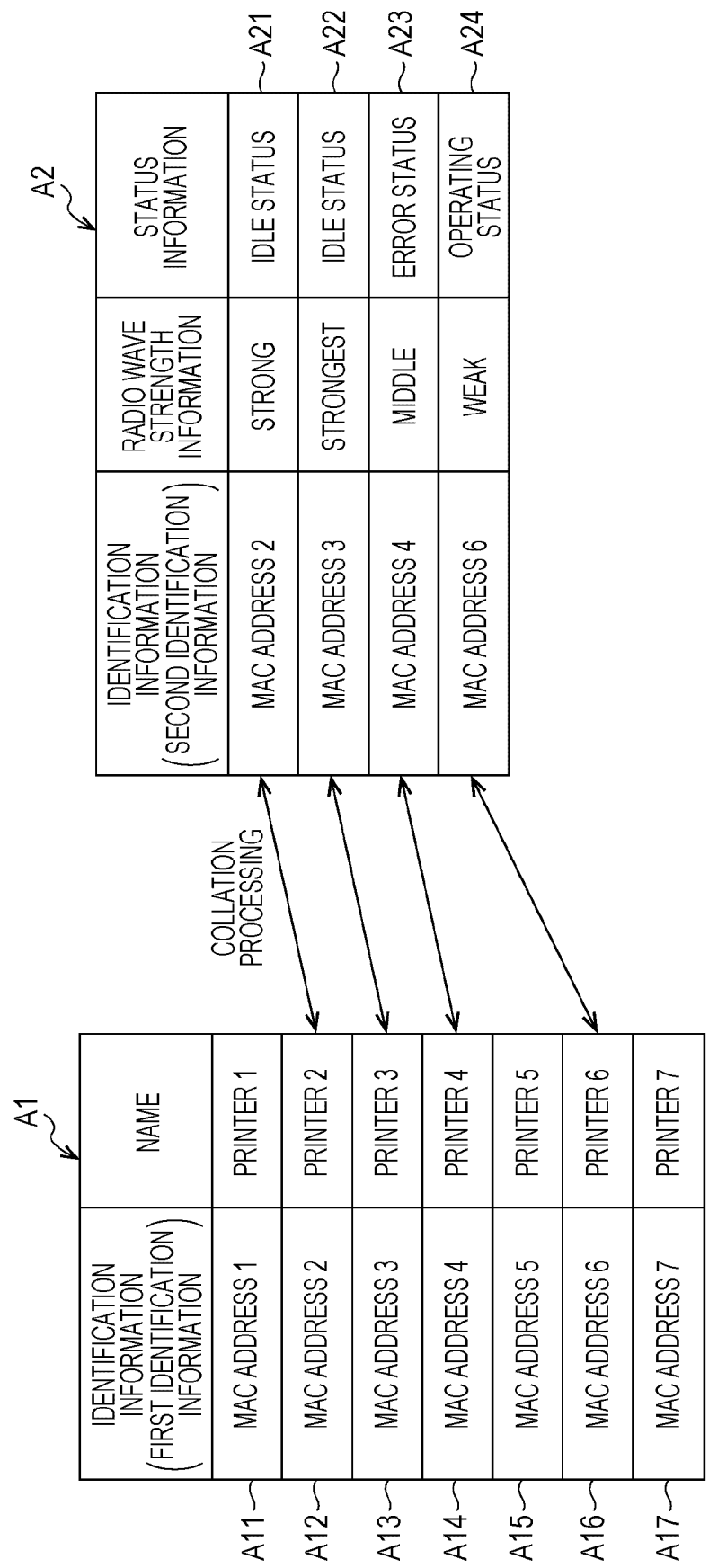
FIG. 5 is a diagram illustrating examples of information that is acquired with Wi-Fi and information that is acquired with BLE.

A1 of FIG. 5 is a diagram illustrating an example of a result of the search. At this point, an example is considered in which identification information (first identification information) on the electronic apparatus 200 and a name of the electronic apparatus 200 are included in the response packet from the electronic apparatus 200. Pieces of identification information are pieces of information by which the electronic apparatuses 200 possibly identify each other. The identification information, for example, is a MAC address of the electronic apparatus 200, and, as the identification information, any other information that is a serial number, or the like may be used. Furthermore, the name is a manufacture number or the like of the electronic apparatus 200, and multiple electronic apparatuses 200 are allowed to have the same name. The terminal apparatus 100 as illustrated in A1 acquires information that results from associating the identification information on, and the name of, the electronic apparatus 200, with the search processing. At this point, in addition to the printers 1 to 3 that are illustrated in FIG. 4, an example is illustrated in which printers 4 to 7 are searched for. A1 of FIG. 5, in other words, refers to pieces of list information on electronic apparatuses 200 to which the terminal apparatus 100 possibly establishes a connection using the first wireless communication unit 121.

It is noted that at this point, the example in which a search is made using the broadcast address is described, but no limitation to this is imposed. For example, an IP address of, a MAC address of, identification information on, a name of, and the like of an electronic apparatus 200 to which the terminal apparatus 100 has made a connection in the past may be stored in the storage unit 160 of the terminal apparatus 100, and the processing unit 110 may perform control that assigns each electronic apparatus 200 a unicast address using the IP address and the like that are stored and transmits the response request packet to each electronic apparatus 200. Even in this case, there is no change in the fact that information that is illustrated in A1 is acquired as a result of the search and A1 refers to the pieces of list information on the electronic apparatuses 200 to which the first wireless communication unit 121 possibly makes a connection.

Furthermore, the second wireless communication unit 122 receives the BLE beacon signal from the electronic apparatus 200. FIG. 6 illustrates an example of a data structure of the BLE beacon signal.

The BLE beacon signal is available for various uses, and in some cases, multiple types of BLE beacon signals are also transmitted and received between the terminal apparatus 100 and the electronic apparatus 200. A beacon identifier is information that specifies for which use the BLE beacon signal is used. The beacon identifier in FIG. 6 is information which indicates that the BLE beacon signal is a beacon for generating the display image, and is information that is different from a beacon identifier of a beacon that is used for any other use.

Pieces of identification information on the electronic apparatuses 200 (second identification information) are pieces of information by which the electronic apparatuses 200 are identifiable from each other. The second identification information is the MAC address of the electronic apparatus 200, but as the second identification information, any other information may be used. However, as the second identification information, information in the same format as the first identification information, or information that is possibly replaced with the first information is used. In a case where the first wireless communication unit 121 acquires a MAC address as the first identification information, a MAC address itself or information which is possibly converted into the MAC address and into which the MAC address is possibly converted, is used as the second identification information that is included in the BLE beacon signal.

Status information is information that indicates a status of the electronic apparatus 200. The status information in a narrow sense is information that specifies whether an operating status of the electronic apparatus 200 is an idle status or an error status. The operating status is a state where the electronic apparatus 200 performs a job, such as printing, using a function of its own. A behavior in a case where a new job is input in the operating status is determined by a setting of the electronic apparatus 200, but for example, after a job that is currently being performed has been completed, proceeding to perform the job that is newly input takes place. The idle status is a state where the electronic apparatus 200 waits for job inputting, without performing a job. The error status is a state where any error occurs, a state where a job cannot be performed, or a state where a problem occurs while a job is performed. In the case of a printer, the error status is a state where ink or toner is used up, a printing medium, such as a paper sheet, is used up, a printing medium is jammed up, a component failure occurs, or the like.

In other words, it is considered that the operating status is a state where a new job cannot be immediately performed, that the idle status is a state where a new job is possibly immediately performed, and that the error status is a state where there is a need for the user to take a corrective action to perform a job.

Furthermore, the processing unit 110 of the terminal apparatus 100 can acquire a radio wave strength information that results when the BLE beacon signal is received, separately from information that is illustrated in FIG. 6. In other words, the radio wave strength information may be reception radio wave or reception signal strength. Based on the radio wave strength information, a distance between the terminal apparatus 100 and the electronic apparatus 200 can be estimated. It is understood that the greater the radio wave strength, the shorter the distance, and the weaker the radio wave strength, the longer the distance. The radio wave strength information may be expressed as multiple levels, such as "strong", "middle", and "weak", and may be expressed as specific numerical values. It is noted that, as in a modification example that will be described below, it is also possible that arithmetic operation processing which computes distance information is performed based on the radio wave strength information. In a case where the arithmetic operation processing is performed, the distance can be expressed in the unit meter or the like, and it is possible that the distance is obtained with the high precision compared with a case where the arithmetic operation processing is not performed.

A2 of FIG. 5 is an example of information that is acquired with the BLE beacon signal. As illustrated in A2, the terminal apparatus 100 acquires information that results from associating the radio wave strength information and the status information with the identification information on the electronic apparatus 200. That is, the information that is acquired with the BLE beacon signal may be radio wave strength information on the beacon signal, may be the status information on the electronic apparatus 200 that transmits the beacon signal, and may be both of them.

As illustrated in A1 and A2 of FIG. 5, the first wireless communication unit 121 acquires the first identification information on the electronic apparatus 200 that is found as a result of the search that uses the first wireless communication scheme, and the second wireless communication unit 122 receives the beacon signal that includes the second identification information on the electronic apparatus 200 that is a signal transmission source. Based on processing that collates the first identification information and the second identification information, the processing unit 110 generates a display image in the display mode, which results from associating the electronic apparatus 200 that is found as a result of the search that uses the first wireless communication scheme and the information that is acquired with the beacon signal, with each other.

In an example in FIG. 5, it is determined that a MAC address in A12 and a MAC address in A21 are the same as a "MAC address 2". That is, it is understood that the radio wave strength information "strong" and the status information "idle status", which are illustrated in A21, are pieces of information relating to the printer 2 in A1. In the same manner, it can be determined that each of A13 and A22, A14 and A23, and A16 and A24 are pieces of information relating to the same electronic apparatus 200. On the other hand, it is determined that an electronic apparatus 200 which is illustrated in each of A11, A15, and A11 does not receive the BLE beacon signal, and the radio wave strength information and the status information are not associated with the electronic apparatus 200.

FIG. 7 illustrates information that is obtained from A1 and A2 in FIG. 5. In this manner, by performing the processing that collates the first identification information and the second identification information, it is possible that the information which is acquired with Wi-Fi and the information which is acquired with BLE are suitably associated with each other.

The processing unit 110 performs processing that displays a display image in the display mode, which results from associating the electronic apparatus 200 that is found as a result of the search that uses the first wireless communication scheme, and the radio wave strength information on the BLE beacon signal, in a state of being associated with each other. Alternatively, the processing unit 110 performs processing that displays the display image in the display mode, which results from associating the electronic apparatus 200 which is found as a result of the search that uses the first wireless communication scheme and the status information. An example will be described below in which both the radio wave strength information and the status information are associated with the electronic apparatus 200 that is found as a result of the search that uses the first wireless communication scheme.

Figure 8:
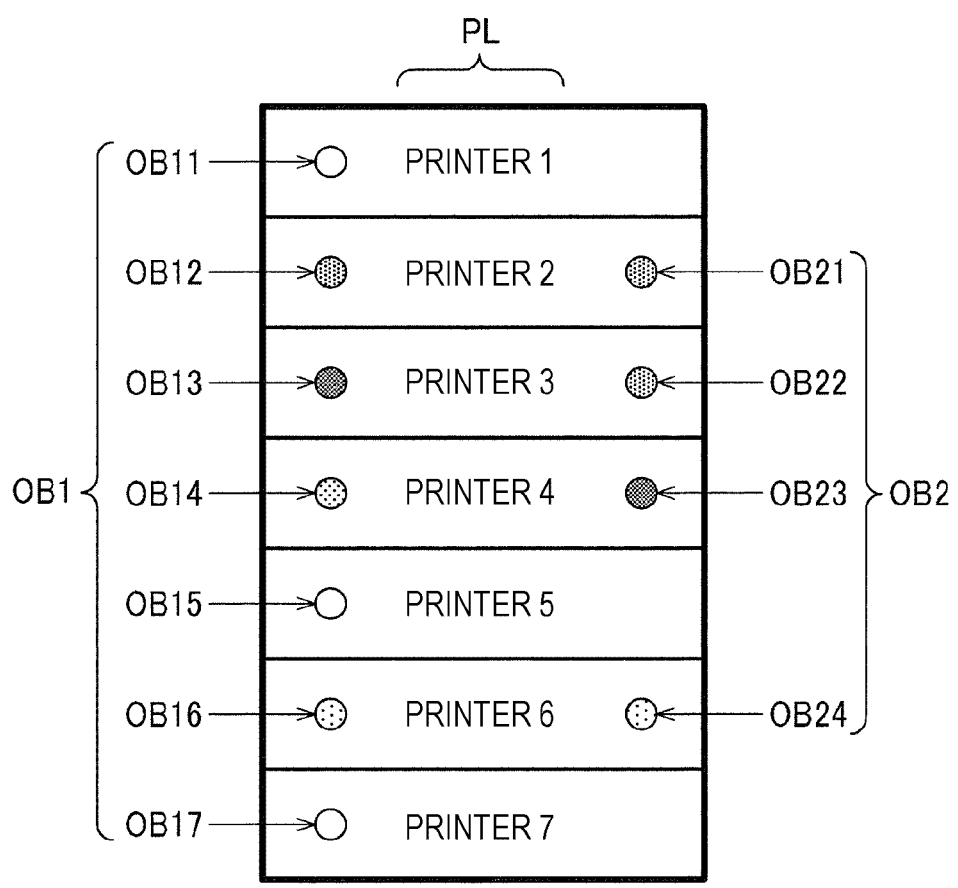
FIG. 8 is a diagram illustrating an example of a display image.

FIG. 8 illustrated an example of the display image according to the present embodiment. The processing unit 110 performs processing that displays a display image in the display mode, on which multiple electronic apparatuses 200, which are found as a result of the search that uses the first wireless communication scheme, are list-played. In an example in FIG. 8, seven electronic apparatuses 200 (printers 1 to 7) that are connected to the external access point 20 are listed up in the order that they are found as a result of the search. If this is done, it is possible that the electronic apparatus 200 that is connectable with Wi-Fi is displayed in a high perspicuity mode. At this time, information that is acquired with the BLE beacon signal is added for the electronic apparatus 200 that has received the BLE beacon signal.

Then, the information that is acquired with the BLE beacon signal is at least one of the radio wave strength information on the beacon signal and the status information on the electronic apparatus 200 that transmits the beacon signal, and the processing unit 110 generates the display image in the display mode, which results from associating at least one of a first object that indicates the radio wave strength information in an identifiable manner and a second object that indicates the status information in an identifiable manner with each one of the multiple electronic apparatuses 200 that are list-displayed.

In an example in FIG. 8, a display that shows whether or not the BLE beacon signal has been received is provided in such a manner that it is identifiable whether the radio wave strength is high or low (whether the distance is long or short). The display image in FIG. 8 includes a list display (hereinafter expressed as a list PL) of the electronic apparatus 200 that is found as a result of the search. Then, an object OB1 (an OB11 to an OB17) in the shape of a circle is displayed, to the left of a name of each electronic apparatus 200 that is included in the list PL, on the display image. The higher the radio wave strength and the shorter the distance, the more thickly an internal color of the object OB1 is expressed, and the lower the radio wave strength and the longer the distance, the more thinly the internal color or the object OB1 is expressed. In a case where the object OB1 is a white-colored circle (the OB11, the OB15, and the OB17), this indicates that the BLE beacon signal from the electronic apparatus 200 cannot be received. The object OB1 corresponds to the first object that indicates the radio wave strength information in an identifiable manner.

The object OB1 is displayed in a state of being associated with each of the electronic apparatuses 200 that are found as a result of the search that uses Wi-Fi, and thus it is possible that the user makes a Wi-Fi connection and makes a suitable selection of the electronic apparatus 200 that is at a short distance from the terminal apparatus 100.

Furthermore, in FIG. 8, an object OB2 (an OB21 to an OB24) in the shape of a circle is displayed to the right of the electronic apparatus 200. The object OB2 is an object of which an internal color or density changes according to the status information on the corresponding electronic apparatus 200. In an example in FIG. 8, the OB21 and the OB22 are the same mode, and the OB21, the OB23, and the OB24 are different modes. For example, the OB21 and OB22 indicate that the electronic apparatus 200 is in an idle status, the OB23 indicates that the electronic apparatus 200 is in an operating status, and the OB24 indicates that the electronic apparatus 200 is in an error status. The object OB2 is set not to be displayed for the electronic apparatus 200 from which the BLE beacon signal is not received. The object OB2 corresponds to the second object indicates the status information in an identifiable manner.

The object OB2 is displayed (or is set not to be displayed) in a state of being associated with each of the electronic apparatuses 200 (the printers 1 to 7) that are found as a result of the search that uses Wi-Fi, and thus it is possible that the user is caused to recognize a status of each electronic apparatus 200, a Wi-Fi connection to which is possible. For example, the user can be caused to select the electronic apparatus 200 that possibly performs printing immediately. By using both the object OB1 and the OB2, it is also possible that a printer that is in the vicinity of the terminal apparatus 100 and possibly performs printing immediately is caused to be selected.

Figure 9:
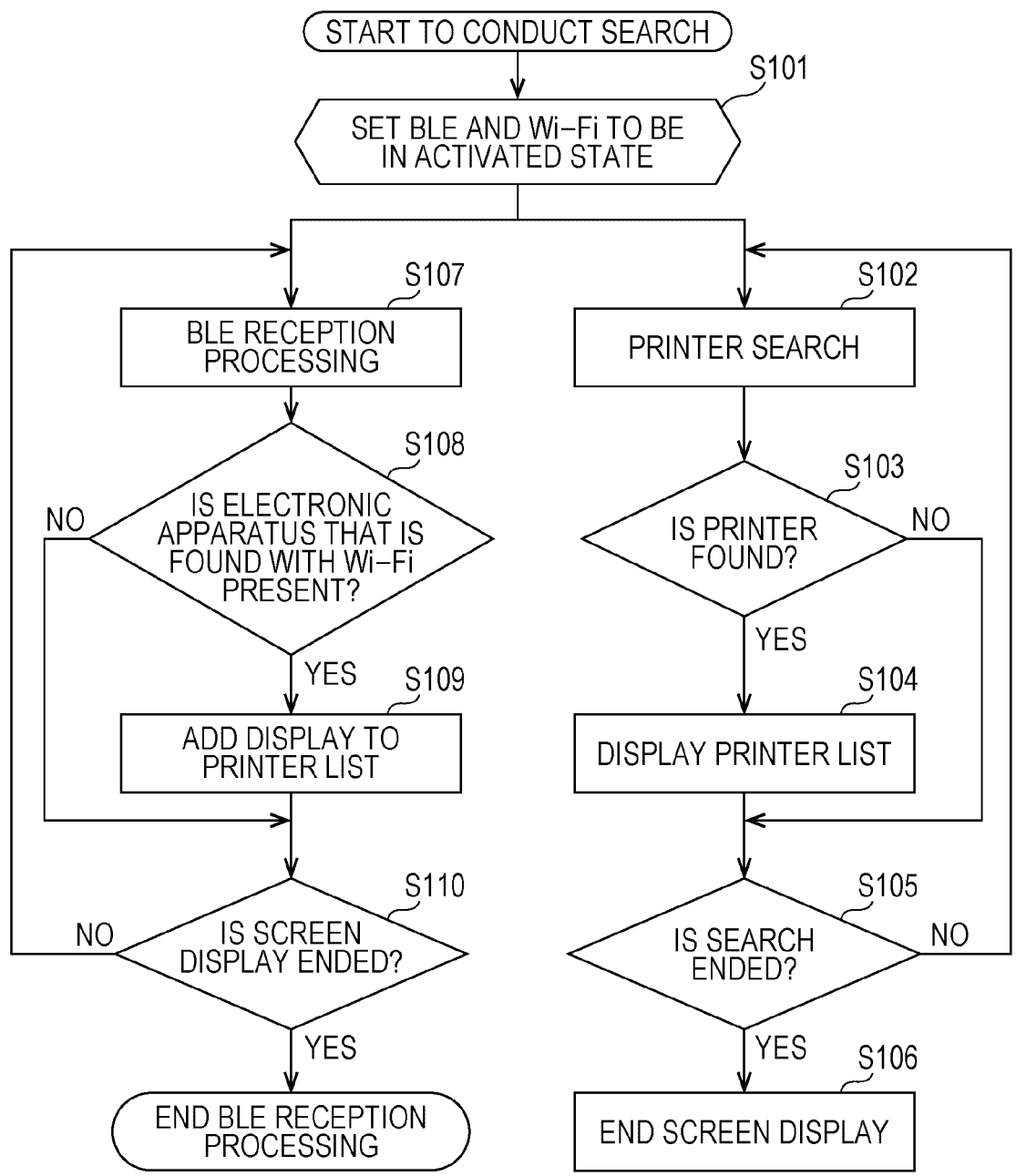
FIG. 9 is a flowchart for describing processing in the terminal apparatus.

FIG. 9 is a flowchart for describing processing that is performed in the processing unit 110 of the terminal apparatus 100. When the processing is started, the processing unit 110 sets BLE and Wi-Fi to be in an activated state (S101). Processing in S101 is equivalent to a state where the first wireless communication unit 121 and the second wireless communication unit 122 are powered off.

The processing unit 110 performs repetition processing (S102 to S106) relating to Wi-Fi, and repetition processing (S107 to S110) relating to BLE concurrently. First, the repetition processing relating to Wi-Fi is described.

The processing unit 110 performs processing that searches for a printer using the first wireless communication unit 121 (S102), and determines whether or not the printer is found as a result of the search (S103). In a case where a new printer is found as a result of the search (Yes in S103), in order to add the printer, the list PL that is a printing list portion of the display image is updated (S104). It is noted that in S103 to S104, update processing may be performed that determines whether or not a printer that is already searched for is found and excludes a printer, which is not found as a result of the search, from the list PL.

Next, the processing unit 110 determines whether or not the search for the electronic apparatus 200 is ended (S105), and, in a case where a result of the determination is Yes, processing that displays a display screen, which is a search screen, or a screen for selecting the electronic apparatus 200 is ended (S106). In a case where the result of the determination is No in S105, returning to S102 and the processing is continued.

Furthermore, the processing unit 110 performs the processing relating to BLE, concurrently with Wi-Fi processing. Specifically, first, with the second wireless communication unit 122, the BLE beacon signal is received from the electronic apparatus 200 (S107). Next, the processing unit 110 determines whether or not an apparatus that is a transmission source of the BLE beacon signal is an apparatus that has been found as a result of the search in S103, that is, an apparatus that is a list display target in S104 (S108). Processing in S108, as described above with reference to FIGS. 5 and 7, can be realized with the processing that collates the first identification information and the second identification information.

In a case where a result of the determination is Yes in S108, an addition information is additionally displayed in a state of being associated with the electronic apparatus 200 that is collated in the list PL (S109). Processing In S109 may be processing that displays the first object (OB1), may be processing that displays the second object (OB2), and may be processing that displays both of them.

Next, the processing unit 110 determines whether or not processing that displays the display image is ended (S110). In S110, it is determined whether or not the processing in S106 is performed. If the result of the search that uses Wi-Fi is not displayed, there is also a low need to acquire and display the radio wave strength information or the status information using BLE. Consequently, in an example in FIG. 9, processing on the BLE side is also ended (Yes in S110) under the condition that the Wi-Fi side processing is ended. In a case where the result of the determination is No in S110, returning to S107 takes place and the processing is continued.

2.3 Second Embodiment

Figure 10:
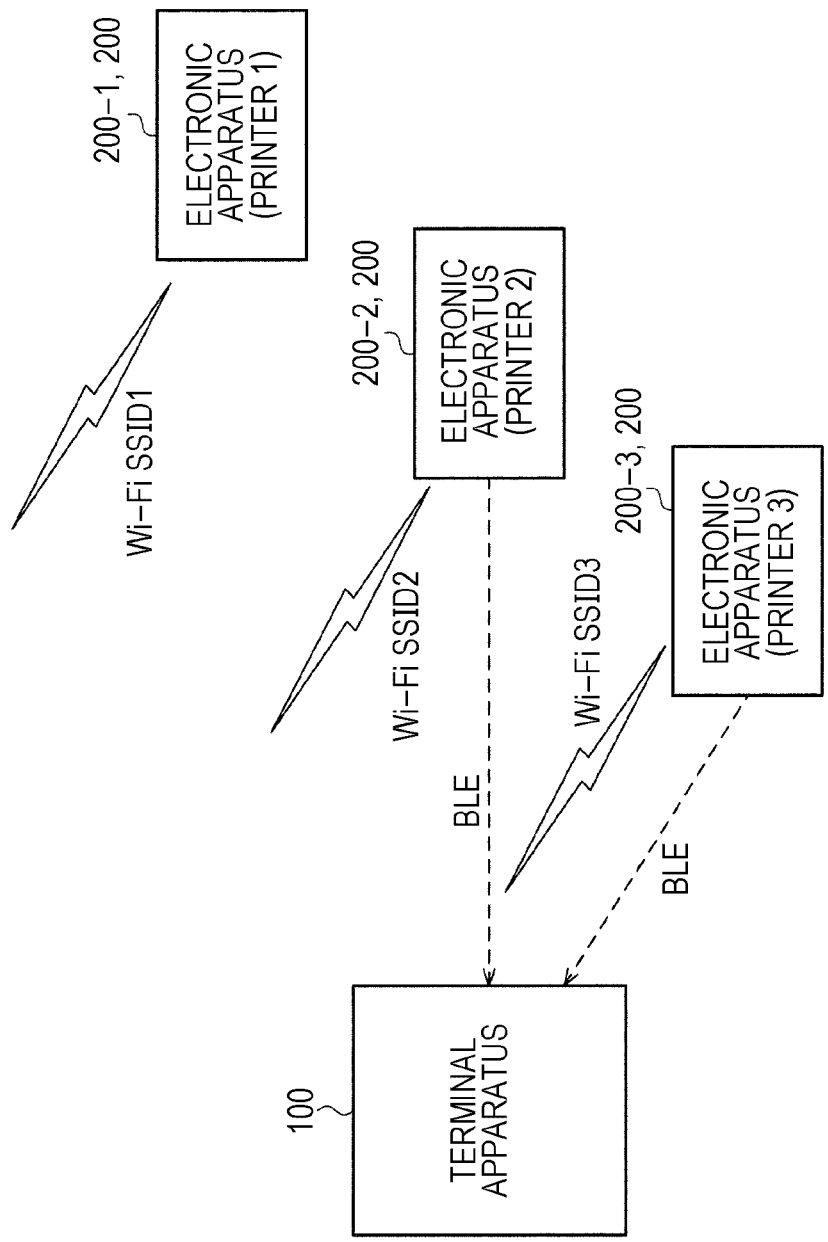
FIG. 10 is a diagram illustrating an example of a configuration of a communication system according to a second embodiment.

FIG. 10 illustrates a specific example of a system according to a second embodiment. As illustrated in FIG. 10, multiple electronic apparatuses 200 each function as access points. In FIG. 10, in the same manner as in FIG. 4, as multiple electronic apparatuses 200, three electronic apparatuses, that is, electronic apparatuses 200-1 to 200-3 are illustrated, and the electronic apparatuses 200-1 to 200-3 are defined as printers 1 to 3, respectively.

In the present embodiment, the first wireless communication unit 121 of the terminal apparatus 100 receives a second beacon signal that is transmitted by the electronic apparatus 200 using the first wireless communication scheme, and thus searches for the electronic apparatus 200. In other words, the terminal apparatus 100 acquires the Wi-Fi beacon signal from the printers 1 to 3 that are the electronic apparatuses 200 which function as the access points, and thus performs processing that searches for the electronic apparatus 200 in compliance with Wi-Fi. In this manner, even in a case where the terminal apparatus 100 and the electronic apparatus 200 make direct connections, suitable search processing can be performed.

Specifically, the Wi-Fi beacon signal includes a basic service set identifier (BSSID) of, an SSID of, a beacon transmission interval of, channel information on, transfer speed information on, capability information on, and the like of the electronic apparatus 200 that is a transmission source. The BSS ID is specifically a MAC address of the electronic apparatus 200, and corresponds to the first identification information described above. The beacon transmission interval, the channel information, the transfer speed information, and the capability information are pieces of information necessary to establish a Wi-Fi connection. Because these pieces of information are widely known, detailed descriptions thereof are omitted.

With the search processing, the processing unit 110 of the terminal apparatus 100 acquires the identification information on the electronic apparatus 200 and information to which an SSID is associated. Specifically, data that results from replacing a name in A1 of FIG. 5 with the SSID is acquired as a result of the search.

Furthermore, the second wireless communication unit 122 receives the BLE beacon signal from the electronic apparatus 200. The data structure of the BLE beacon signal is the same as in FIG. 6, and information that is acquired with the BLE beacon signal is the same as in A2 of FIG. 5. The terminal apparatus 100 acquires information that results from associating the radio wave strength information and the status information with the identification information on the electronic apparatus 200.

The processing unit 110 associates the electronic apparatus 200 that is found as a result of the search that uses the Wi-Fi beacon signal and the information that is acquired with the BLE beacon signal with each other. Specifically, in the same manner as in the first embodiment, the processing that collates the first identification information and the second identification information is performed, and thus the information that is acquired with Wi-Fi and the information that is acquired with BLE are associated with each other. In the present embodiment, data that results from replacing the name in FIG. 7 with the SSID is acquired as a result of the association.

Figure 11:
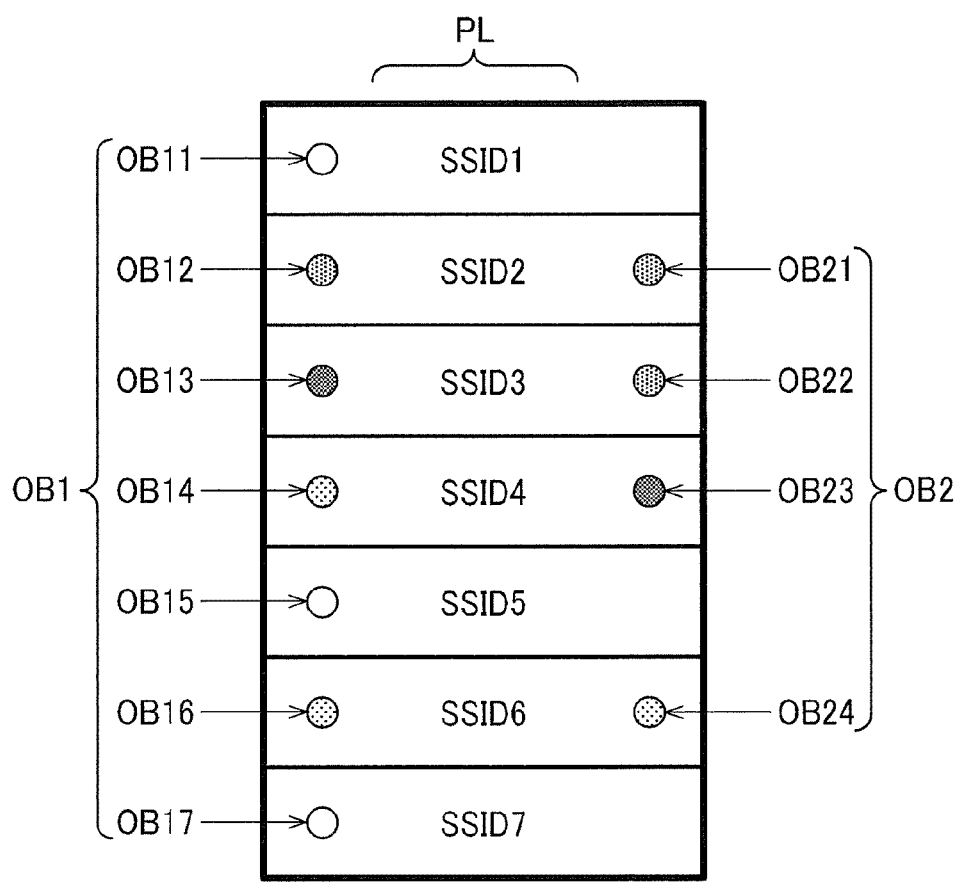
FIG. 11 is a diagram illustrating another example of the display image.

FIG. 11 illustrated an example of the display image according to the present embodiment. The processing unit 110 generates the display image in the display mode, on which multiple electronic apparatuses 200 that are found as a result of the search which uses the first wireless communication scheme, is list-displayed. In an example in FIG. 11, SSIDs (a SSID1 to a SSID7) seven electronic apparatuses 200, from which Wi-Fi beacon signals are possibly received by the terminal apparatus 100, are listed up in the order in which they are received. If this is done, it is possible that the electronic apparatus 200 that is connectable with Wi-Fi is displayed in a high perspicuity mode.

In the same manner as in FIG. 8, the radio wave strength information is displayed in a manner that is identifiable using the object OB1 and the status information is displayed in a manner that is identifiable using the object OB2.

A flow for processing that is performed in the processing unit 110 of the terminal apparatus 100 is the same as in FIG. 9. However, the processing that searches for a printer in S102 is the processing that transmits the response request packet and the processing that receives the response packet, in the first embodiment, but is differently processing that receives the Wi-Fi beacon signal, in the present embodiment.

3. Modification Example

Several modification examples will be described below.

3.1 Modification Example of the Display Image

The example of the display image is described with reference to FIGS. 8 and 11. However, the first object and the second object are not limited to an example in FIG. 8 or 11. Furthermore, the order of the list display is not limited to the order in which the electronic apparatuses are found as a result of the search, and various modification implementations of the display mode of the display image are possible.

Figure 12:
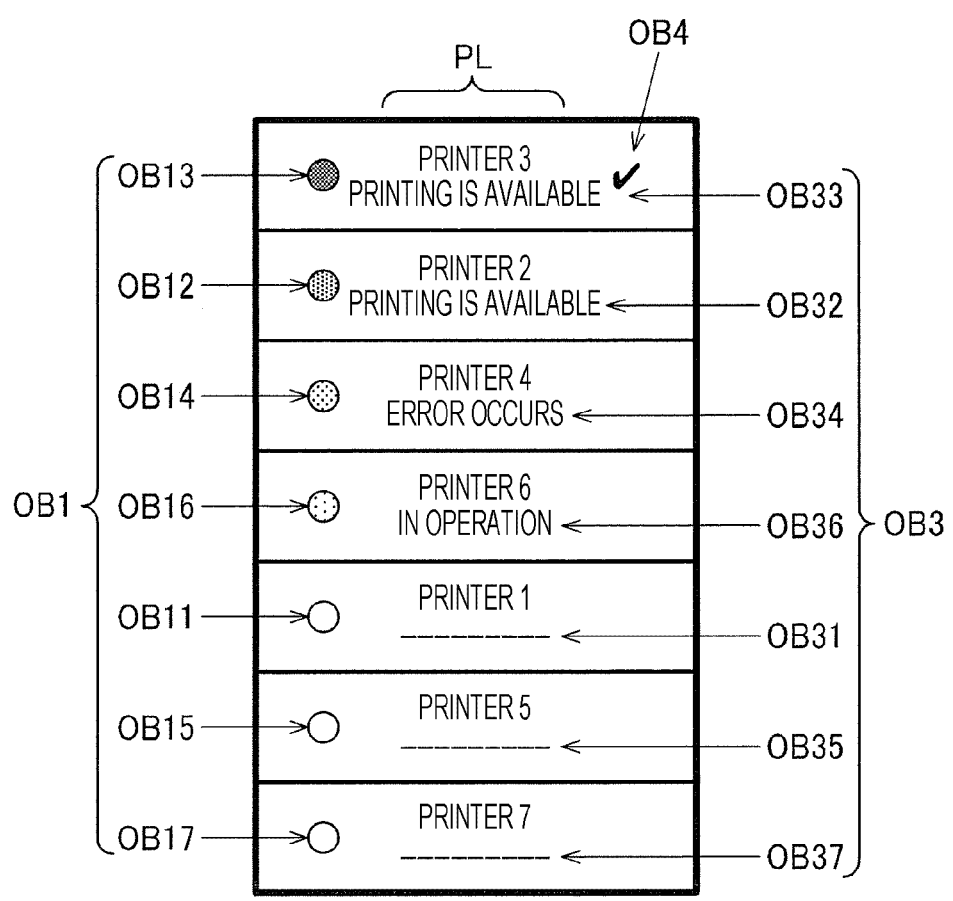
FIG. 12 is a diagram illustrating another example of the display image.

FIG. 12 illustrates another example of the display image. A display image in FIG. 12 also includes a list PL of the electronic apparatus 200 that are found as a result of the search which uses the first wireless communication scheme. At this point, an example is described in which the list PL is a list of names of the electronic apparatuses 200, but the list LP may be a list of SSIDs as illustrated in FIG. 11. As in FIG. 8, on the display image, the object OB1 (an OB11 to an OB17) in the shape of a circle is displayed to the left of a name of each electronic apparatus 200 that is included in the list PL, and the object OB1 is displayed in such a manner that the radio wave strength information is identifiable.

In FIG. 12, the order of the display in the list PL is not the order in which the electronic apparatuses 200 are found as a result of the search, as illustrated in FIG. 8, and the electronic apparatuses 200 are sorted in the order of decreasing the radio wave strength that is indicated by the radio wave strength information. Specifically, the printer 3 that has the highest radio wave strength is displayed on the top of the list PL, and then, the printer 2, the printer 4, and the printer 6 in this order are arranged in a top-down manner. The printers 1, 5, and 7 from which the BLE beacon signals are not received are arranged in a top-down manner on the lower portion of the list PL in the order in which they are found as a result of the search.

For example, the processing unit 110 performs processing that arranges the electronic apparatuses 200 in a top-down manner in the order in which they are found as a result of the search that uses the first wireless communication scheme. Thereafter, when the BLE beacon signals are received, the processing unit 110 performs sorting processing based on the radio wave strength information and updates the display image. Specifically, the processing unit 110 performs display processing that adds the electronic apparatus 200 that is newly found in S104 in FIG. 9 at the end of the list, and thereafter, performs processing that updates the order of display based on the radio wave strength information in S109.

Furthermore, in FIG. 12, an object OB3 (an OB31 to an OB37) that is text information is displayed under a name of each electronic apparatus 200 that is included in the list PL. In an example in FIG. 12, the idle status is indicated by the text "PRINT IS AVAILABLE", the operating status is indicated by the text "IN OPERATION", and the error status is indicated by the text "ERROR OCCURS". Furthermore, the electronic apparatus 200, the status information on which is not acquired, is displayed in a broken line. In FIG. 12, the object OB3 corresponds to the second object that is displayed in such a manner that the status information is identifiable.

Furthermore, a display image in each of FIGS. 8, 11, and 12 is a screen for urging the user to select the electronic apparatus 200 which is a target that performs a job. For this reason, in a case where a specific electronic apparatus 200 has already been selected, the selected electronic apparatus 200 may be displayed in an identifiable manner. In a case where the user performed in the past an operation of selecting the electronic apparatus 200, in a case where the processing unit 110 of the terminal apparatus 100 automatically selects a given electronic apparatus 200 by default, and so on, the electronic apparatus 200 is considered as having been selected. In an example in FIG. 12, an object OB4 is displayed to the right of a name of the electronic apparatus 200 that has been selected, of the electronic apparatuses 200 that are included in the list PL. At this point, the object OB4 that is a check mark is displayed to the right side of the printer 3, and thus is clearly indicated that the printer 3 is selected.

Furthermore, the objects OB1 to OB4 are not limited to objects that are different from the list PL, and may be configured to be integrally combined with the list PL. For example, by changing a font or size of a character in the list PL, a color of a character, and the like, the radio wave strength information, the status information, the information on the selected electronic apparatus 200, and the like may be displayed in an identifiable manner.

3.2 Handover from BLE to Wi-Fi

In a case where, on the display screen on which images in FIG. 8 and other figures are displayed, any electronic apparatus 200 is selected, the first wireless communication unit 121 of the terminal apparatus 100 establishes a Wi-Fi connection to the selected electronic apparatus 200. In an example in FIG. 4, because the terminal apparatus 100 has made a connection to the external access point 20, the connection to the electronic apparatus 200 through the external access point 20 is possible. However, in an example in FIG. 10, in order to establish the connection to the selected electronic apparatus 200, there is a need for not only an SSID of the electronic apparatus 200 but also a password that corresponds to the SSID.

In a case where the connection to a target electronic apparatus 200 has been established in the past, the SSID and the password are stored in the storage unit 160 of the terminal apparatus 100 in state of being associated with each other. When the connection is established using the first wireless communication unit 121, the processing unit 110 reads the SSID and the password from the storage unit 160, and performs processing that established a connection using the SSID and the password.

Even in a case where the target electronic apparatus 200 has not been established in the past, or even in a case where the password is erased from the storage unit 160, the inputs the password, and thus it is possible that the Wi-Fi connection is established. However, considering the security, it is desirable that the password is a complicated sequence of letters and numbers, and manual inputting imposes a burden on the user.

Consequently, in the present embodiment, the second wireless communication unit 122 of the terminal apparatus 100 acquires connection information that is used for the first wireless communication scheme, using the beacon signal in compliance with the second wireless communication scheme, and the first wireless communication unit 121 establishes a connection to the electronic apparatus 200 using the connection information. The connection information here is information that includes an SSID and a password. Furthermore, the connection information may include information that specifies an encryption scheme, and the like.

If this is done, it is possible that the connection between the terminal apparatus 100 and the electronic apparatus 200 switches to a first communication scheme, using a result of communication in compliance with a second communication scheme. The switching among the communication schemes is hereinafter also expressed as handover. The handover in the present embodiment is specifically handover from BLE to Wi-Fi.

FIG. 13 illustrates an example of a data structure of the BLE beacon signal. In addition to the beacon identifier, and the identification information and the status information on the electronic apparatus 200, which are illustrated in FIG. 6, the BLE beacon signal includes an SSID of the electronic apparatus 200 that functions as an access point, and a password that corresponds to the SSID.

Stored in the storage unit 160 of the terminal apparatus 100 is information that results from associating the radio wave strength information, the status information, the SSID, and the password with data that results from extending A2 of FIG. 5, specifically the identification information on the electronic apparatus 200. In a case where a given electronic apparatus 200 is selected on a screen on which images in FIG. 8 and other figures are displayed, the processing unit 110 specifies an SSID and a password that correspond to the selected electronic apparatus 200, and performs processing that establishes a Wi-Fi connection to the electronic apparatus 200 using the SSID and the password. If this is done, because the establishment of the Wi-Fi connection can be automated, a reduction in the burden on the user is possible.

It is noted that in FIG. 13, an example in which the password itself is included in the BLE beacon signal is illustrated, but no limitation to this is imposed. For example, a rule for generation of a password may be shared between the terminal apparatus 100 and the electronic apparatus 200, and the processing unit 110 of the terminal apparatus 100 may perform processing that generates a password according to the rule for generation. Specifically, the processing unit 110 performs conversion processing that is based on the MAC address which is acquired with the BLE beacon signal, and generates a password. It is noted that the processing unit 110 may be capable of generating a password that corresponds to an SSID, and a target for the conversation processing may be information other than the MAC address. If this is done, because there is no need to broadcast a password with the BLE beacon signal, it is possible that the security is improved.

3.3 Distance Calculation that is Based on the Radio Wave Strength Information Furthermore, the example is described above in which the radio wave strength information is radio wave strength and in which a display is provided in such a manner that it is identifiable whether the radio wave is high or low. However, the radio wave strength information may include information that is calculated based on the radio wave strength. Specifically, the processing unit 110 of the terminal apparatus 100 calculates a distance between the terminal apparatus 100 and the electronic apparatus 200 based on the radio wave strength, and generates a display image on which a result of the calculation is displayed in an identifiable manner.

FIG. 14 illustrates an example of a data structure of the BLE beacon signal. In addition to the beacon identifier, and the identification information and the status information on the electronic apparatus 200, which are illustrated in FIG. 6, the BLE beacon signal includes information on a reference radio wave strength. The reference radio wave strength is a received signal strength indication (RSSI) of the beacon signal in a reception side apparatus, which results when the reception side apparatus is installed at a location that is at a reference distance away from a beacon signal transmission side apparatus. The reference distance, for example, is 1 m, but may be set to be a different distance.

Generally, it is known that the radio wave strength is inversely proportional to a square of a distance and thus becomes weakened over distance. Consequently, if the radio way strength at the reference distance is known, the distance between the terminal apparatus 100 and the electronic apparatus 200 can be calculated based on the radio wave strength of the BLE beacon signal that is actually received.

In the same manner as in FIG. 8 and other figures, an object that indicates a distance in an identifiable manner may be an object in the shape of a circle, which varies in density. For example, the processing unit 110 performs processing that displays certain radio wave strength information in a manner that is identifiable with a distance, using an object in which the shorter the distance, the higher the density, and the longer the distance, the lower the density. However, a mode for displaying an object is not limited to this. The object that expresses an estimated distance as a numerical value such as "3 m" may be displayed, and a distance may be set to be expressed by changing a size of the object according to a distance, changing a color and a size of a string of characters that is included in the list PL, a thick font of the character, and the like, and so on.

3.4 Modification Example of a Mode for Connecting the Terminal Apparatus

Furthermore, in FIG. 4, the example is illustrated in which the terminal apparatus 100 is connected to an external access point 20 and in which the electronic apparatus 200 that is connected to the external access point 20 is searched for. Furthermore, in FIG. 10, the example is illustrated in which the electronic apparatus 200 functions as an access point, in which the terminal apparatus 100 receives the Wi-Fi beacon signal, and in which the electronic apparatus 200 is searched for. However, with Wi-Fi standards, it is possible that the terminal apparatus 100 makes a connection to the external access point 20 and at the same time receives the Wi-Fi beacon signal.

Figure 15:
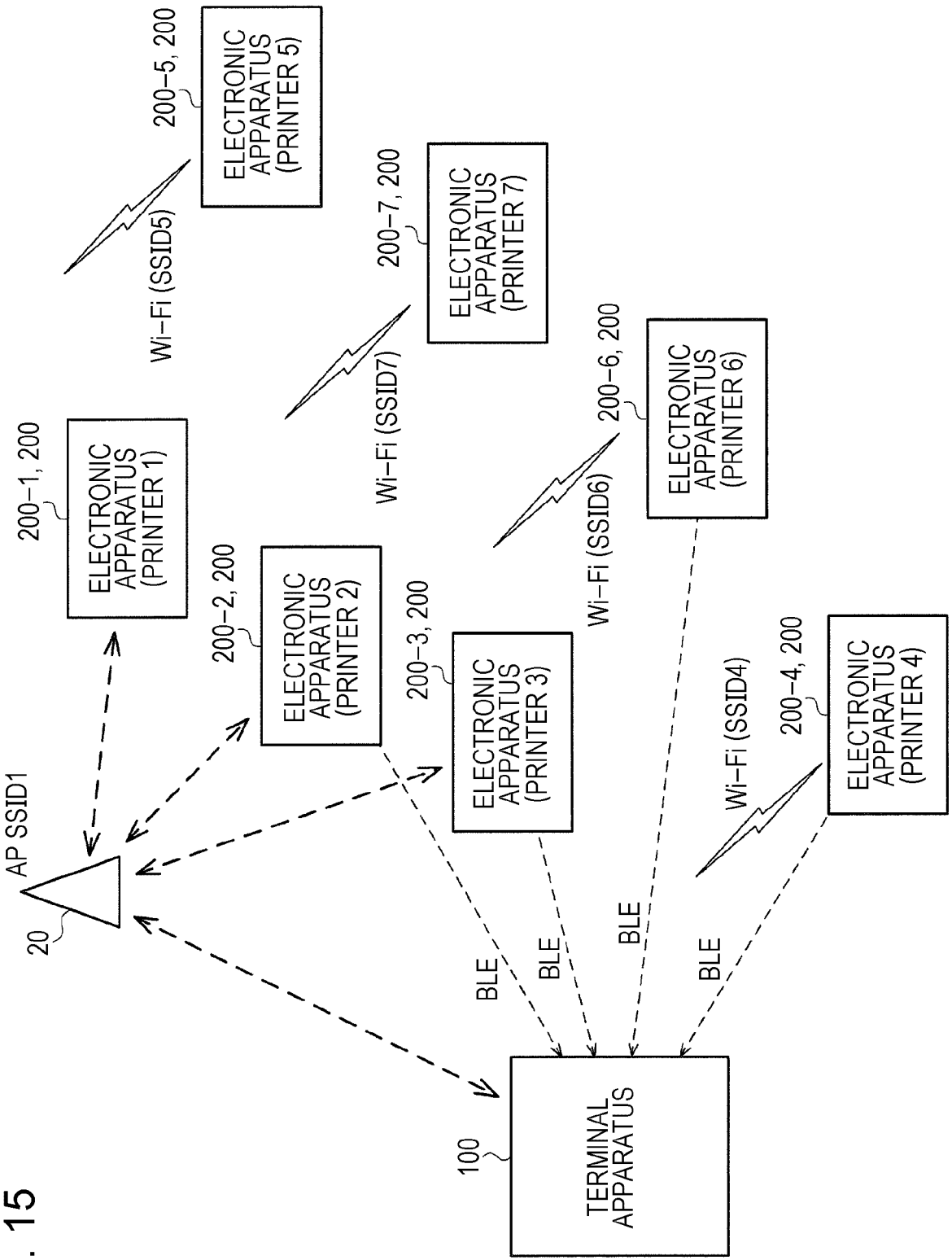
FIG. 15 is a diagram illustrating an example of a configuration of a communication system according to a modification example.

FIG. 15 illustrates a specific example of a system according to the present modification example. As illustrated in FIG. 15, the terminal apparatus 100 and the printers 1 to 3 that are the electronic apparatuses 200-1 to 200-3, respectively, make connections to the external access point 20 using the Wi-Fi infrastructure mode. Furthermore, the printers 4 to 7, which are electronic apparatus 200-4 to 200-7, each function as access points, and the terminal apparatus 100 receives a Wi-Fi beacon signal from each of the printers 4 to 7.

Each of the apparatuses that are the printers 1 to 7 transmits the advertisement packet that is the BLE beacon signal. In FIG. 15, an example is illustrated in which the second wireless communication unit 122 of the terminal apparatus 100 can receive BLE beacon signals of the printers 2 to 4 and the printer 6 that are at a nearby location, but cannot receive BLE beacon signals of the printers 1, 5, and 7 that are at a distant location.

In the present embodiment, for the search for the electronic apparatus 200 using Wi-Fi, the processing unit 110 performs both the search processing that is described in the first embodiment and the search processing that is described in the second embodiment. Specifically, the processing that transmits the response request packet through the external access point 20 and the processing that receives the response packet are performed, and the electronic apparatus 200 that is connected to the external access point 20 is searched for. The processing unit 110 acquires information that results from associating identification information and a name with each of the printers 1 to 3, as a result of the search. Furthermore, the processing unit 110 performs the processing that receives the Wi-Fi beacon signal using the first wireless communication unit 121, and searches for the electronic apparatus 200 that functions as an access point. The processing unit 110 acquires information that results from associating identification information and an SSID with each of the printers 4 to 7, as a result of the search. That is, as a result of the search, the information that results from associating the name or the SSID associating the identification information on the electronic apparatus 200 is acquired.

The present modification example is the same as the first embodiment or the second embodiment in that the second wireless communication unit 122 receives the BLE beacon signal and the information that is equivalent to A2 of FIG. 5 is acquired using the BLE beacon signal.

In the present modification example, the identification information on the electronic apparatus 200 is also acquired as a result of the search that uses Wi-Fi. For this reason, with the processing that collates the first identification information and the second identification information, it is possible that the radio wave strength information or the status information that is acquired with the BLE beacon signal is associated with the electronic apparatus 200 that is found as a result of the search that uses Wi-Fi.

Figure 16:
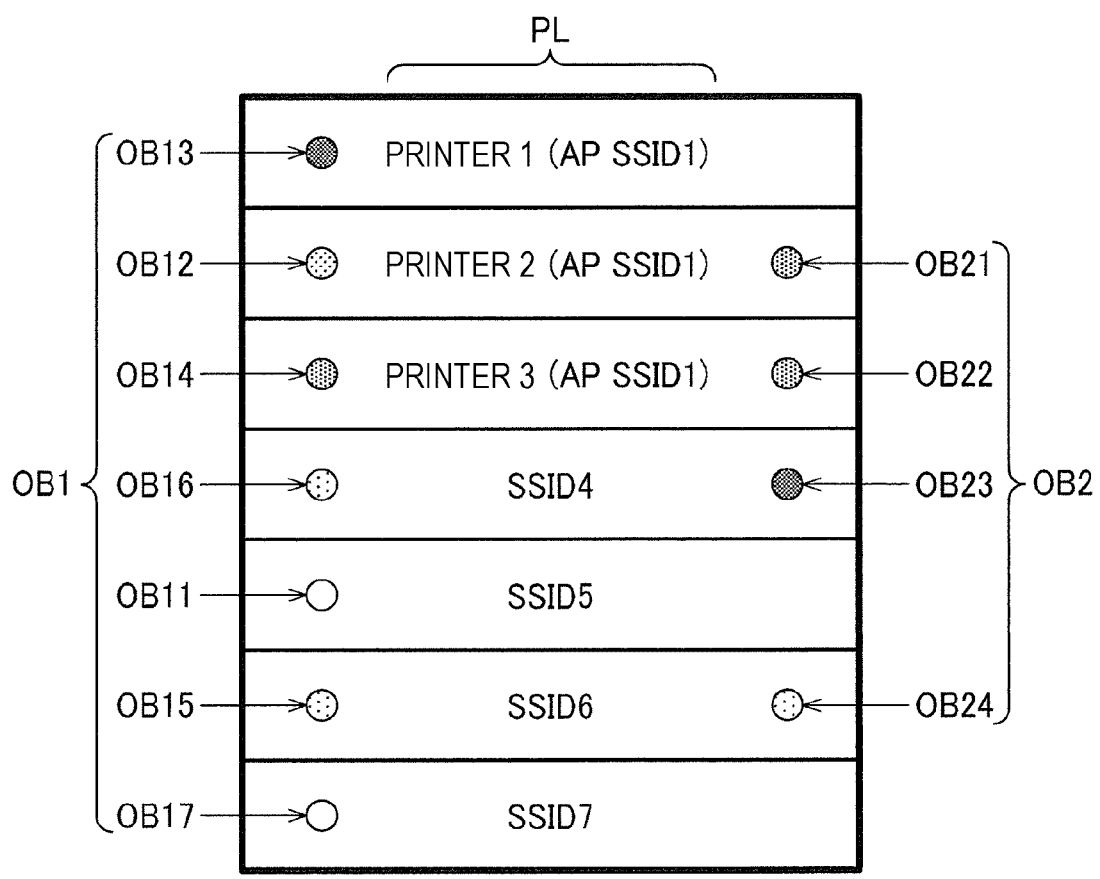
FIG. 16 is a diagram illustrating another example of the display image.

FIG. 16 illustrates another example of the display image. A display image in FIG. 16 also includes a list PL of the electronic apparatus 200 that are found as a result of the search which uses the first wireless communication scheme. As described above, each of the printers 1 to 3 are associated with the identification information and the name, and each of the printers 4 to 7 is associated with the identification information and the SSID. A list PL according to the present modification example may be a list that shows a name of each of the printers 1 to 3 and shows an SSID of each of the printers 4 to 7. Alternatively, as illustrated in FIG. 16, the list PL may be a list that shows the name and an SSID of each of the printers 1 to 3 and shows the SSID of each of the printers 4 to 7.

With a display in FIG. 16, SSIDs of all electronic apparatus 200 are displayed, and because of this, a display that is easy for the user to understand is possible. It is noted that the printers 1 to 3 do not function as access points. For this reason, the SSIDs that are displayed in a state of being associated with the printers 1 to 3, respectively, are an SSID of the external access point 20. In an example in FIG. 16, with the presence or absence of the name, a display is provided in such a manner that it identifiable whether each electronic apparatus 200 in the list PL is connected through the external access point 20 or is directly connected. Moreover, from the fact that an SSID is common to the printers 1 to 3, it can be clearly indicated that the printers 1 to 3 are possibly connected through the external access point 20.

3.5 System and Program

Furthermore, a target in which the technique according to the present embodiment finds application is not limited to the terminal apparatus 100 that has been described above.

The technique according to the present embodiment, as illustrated in FIG. 1, can find application in the communication system 10 that includes the terminal apparatus 100 and the electronic apparatus 200, which are described above. The communication system 10, as illustrated in FIG. 4, 10, or 15, may include multiple electronic apparatuses 200.

Furthermore, one or several of, or most of the processing operations by the terminal apparatus 100 or the electronic apparatus 200 according to the present embodiment may be realized by a program. In this case, a CPU or the like executes the program, and thus the terminal apparatus 100 and the like according to the present embodiment are realized. Specifically, the program that is stored on a non-volatile information storage medium is read and the processor such as the CPU executes the program that is read. The information storage medium here is a computer-readable recording medium. A program, data, and the like are stored in the information storage medium. A function of the information storage medium can be realized by an optical disk, such as a DVD or a CD, an HDD, a memory, or the like. Then, the processor such as the CPU performs various processing operations according to the present embodiment based on the program that is stored in the information storage medium. That is, a program that causes a computer to function as each unit according to the present embodiment is stored in the information storage medium.

Furthermore the technique according to the present embodiment can find application in a display control method that performs one or several of, or all of the processes that are illustrated in FIG. 9, a communication control method, a method of controlling the terminal apparatus 100, or a method of operating the terminal apparatus 100. In a display control method according to the present embodiment, an electronic apparatus 200 is searched for through wireless communication that uses a first wireless communication scheme, a beacon signal in compliance with a second wireless communication scheme that is different from the first wireless communication scheme is received from the electronic apparatus 200, and processing is performed that displays on a display unit a display image in a display mode, which results from associating the electronic apparatus 200 that is found as a result of the search which uses the first wireless communication scheme, and information that is acquired with the beacon signal which is received using the second wireless communication scheme, with each other.

The embodiments and the modification examples thereof in which the invention finds application are described above, but the invention is not limited to the embodiments and the modification examples thereof as are. At stages of implementation, a constituent element can be modified and thus a modification thereto can be realized within the scope that does not depart from the gist of the invention. Furthermore, various inventions can be conceived and be reduced to practice by suitably combining the multiple constituent elements that are disclosed in each of the embodiments or each of the modification examples thereof, which are described above. For example, of all constituent elements that are described in each of the embodiments or each of the modification examples thereof, several constituent elements may be deleted. Moreover, the constituent elements that are described in the different embodiments or the different modification examples thereof may be suitably combined. Furthermore, in the specification or the drawings, a term that is described at least once together with a different term that has a broader meaning or the same meaning can be replaced with the different term, throughout the specification or the drawings. In this manner, various modifications or applications are possible within the scope that does not depart from the gist of the invention.

The entire disclosure of Japanese Patent Application No. 2018-032856, filed Feb. 27, 2018 is expressly incorporated by reference herein.

What is claimed is:

1. A terminal apparatus comprising:
   a first wireless communication interface that performs wireless communication with an electronic apparatus using a first wireless communication scheme;
   a second wireless communication interface that performs wireless communication with the electronic apparatus using a second wireless communication scheme that is different from the first wireless communication scheme; and
   a processor that performs communication control of the first wireless communication interface and the second wireless communication interface,
   wherein the first wireless communication interface searches for the electronic apparatus using the first wireless communication scheme, the searching for the electronic apparatus comprising:
      sending out a response request packet using the first wireless communication scheme; and
      in response to receiving a response packet from the electronic apparatus, determining that the electronic apparatus is found, the response packet includes identification information of the electronic apparatus,
   wherein the second communication interface receives a beacon signal from the electronic apparatus using the second wireless communication scheme, the beacon signal corresponding to an advertisement packet that contains identification information, status information, and radio wave strength information of the electronic apparatus,
   wherein in response to determining that the identification information of the electronic apparatus received using the first wireless communication scheme and the identification information of the electronic apparatus received using the second wireless communication scheme match, the processor performs processing that displays on a display a display image which associates the electronic apparatus that is currently found as a result of the search which uses the first wireless communication scheme and information that is currently acquired with the beacon signal which is received using the second wireless communication scheme, wherein the processor performs processing that displays on the display the display image which associates at least one of a first user interface object that indicates the radio wave strength information in an identifiable manner and a second user interface object that indicates the status information in an identifiable manner, the at least one of the first user interface object or the second user interface object being displayed proximately next to a displayed identification of the electronic apparatus, which is included in a displayed list of electronic apparatuses, such that the display image shows the electronic apparatus that is currently connected via the first communication scheme, and wherein the first user interface object is different from the displayed identification of the electronic apparatus.

2. The terminal apparatus according to claim 1, wherein the first wireless communication interface acquires first identification information on the electronic apparatus that is found as a result of the search which uses the first wireless communication scheme, wherein the second wireless communication interface receives the beacon signal that includes a second identification information on the electronic apparatus that is a transmission source, and wherein, based on processing that collates the first identification information and the second identification information, the processor performs processing that displays on the display the display image which associates the electronic apparatus that is found as a result of the search which uses the first wireless communication scheme and the information that is acquired with the beacon signal.

3. The terminal apparatus according to claim 1, wherein the information that is acquired with the beacon signal is radio wave strength information on the beacon signal, and wherein the processor performs processing that displays on the display the display image which associates the electronic apparatus that is found as a result of the search which uses the first wireless communication scheme and the radio wave strength information on the beacon signal.

4. The terminal apparatus according to claim 1, wherein the information that is acquired with the beacon signal is status information on the electronic apparatus that transmits the beacon signal, and wherein the processor performs processing that displays on the display the display image which associates the electronic apparatus that is found as a result of the search which uses the first wireless communication scheme and the status information.

5. The terminal apparatus according to claim 1, wherein the processor performs processing that displays on the display the display image on which multiple electronic apparatuses that are found as a result of the search which uses the first wireless communication scheme are list-displayed.

6. The terminal apparatus according to claim 1, wherein the first wireless communication interface establishes a connection to the electronic apparatus using the first wireless communication scheme, and wherein the processor performs processing that transmits processing-target data to the electronic apparatus which establishes the connection, or processing that receives the processing-target data from the electronic apparatus which establishes the connection.

7. The terminal apparatus according to claim 1, wherein the first wireless communication interface searches a network, to which the terminal apparatus connects using the first wireless communication scheme, for the electronic apparatus.

8. The terminal apparatus according to claim 1, wherein the first wireless communication interface receives a second beacon signal that is transmitted by the electronic apparatus using the first wireless communication scheme, and thus searches for the electronic apparatus.

9. The terminal apparatus according to claim 8, wherein the second wireless communication interface acquires connection information that is used for the first wireless communication scheme, using the beacon signal in compliance with the second wireless communication scheme, and wherein the first wireless communication interface establishes a connection to the electronic apparatus using the connection information.

10. A communication system comprising:

the terminal apparatus according to claim 1; and the electronic apparatus.

11. A non-transitory computer-readable recording medium on which a program is recorded, the program causing a computer to function as:

a first wireless communication interface that performs a wireless communication with an electronic apparatus using a first wireless communication scheme;

a second wireless communication interface that performs wireless communication with the electronic apparatus using a second wireless communication scheme that is different from the first wireless communication scheme; and a processor that performs communication control of the first wireless communication interface and the second wireless communication interface, wherein the first wireless communication interface searches for the electronic apparatus using the first wireless communication scheme, the searching for the electronic apparatus comprising:

sending out a response request packet using the first wireless communication scheme; and in response to receiving a response packet from the electronic apparatus, determining that the electronic apparatus is found, the response packet includes identification information of the electronic apparatus, wherein the second communication interface receives a beacon signal from the electronic apparatus using the second wireless communication scheme, the beacon signal corresponding to an advertisement packet that contains identification information, status information, and radio wave strength information of the electronic apparatus, wherein in response to determining that the identification information of the electronic apparatus received using the first wireless communication scheme and the identification information of the electronic apparatus received using the second wireless communication scheme match, the processor performs processing that displays on a display a display image which associates the electronic apparatus that is currently found as a result of the search which uses the first wireless communication scheme and information that is currently acquired with a beacon signal which is received using the second wireless communication scheme, wherein the processor performs processing that displays on the display the display image which associates at least one of a first user interface object that indicates the radio wave strength information in an identifiable manner and a second user interface object that indicates the status information in an identifiable manner, the at least one of the first user interface object or the second user interface object being displayed proximately next to a displayed identification of the electronic apparatus, which is included in a displayed list of electronic apparatuses, such that the display image shows the electronic apparatus that is currently connected via the first communication scheme, and wherein the first user interface object is different from the displayed identification of the electronic apparatus.

12. A display control method comprising:

searching for an electronic apparatus through wireless communication that uses a first wireless communication scheme, comprising:
- sending out a response request packet using the first wireless communication scheme; and
- in response to receiving a response packet from the electronic apparatus, determining that the electronic apparatus is found, the response packet includes identification information of the electronic apparatus;

receiving a beacon signal in compliance with a second wireless communication scheme that is different from the first wireless communication scheme from the electronic apparatus, the beacon signal corresponding to an advertisement packet that contains identification information, status information, and radio wave strength information of the electronic apparatus;

in response to determining that the identification information of the electronic apparatus received using the first wireless communication scheme and the identification information of the electronic apparatus received using the second wireless communication scheme match, performing processing that displays on a display a display image which associates the electronic apparatus that is currently found as a result of the search which uses the first wireless communication scheme, and information that is currently acquired with the beacon signal which is received using the second wireless communication scheme;

displaying on the display the display image which associates at least one of a first user interface object that indicates the radio wave strength information in an identifiable manner and a second user interface object that indicates the status information in an identifiable manner, the at least one of the first user interface object or the second user interface object being displayed proximately next to a displayed identification of the electronic apparatus, which is included in a displayed list of electronic apparatuses, such that the display image shows the electronic apparatus that is currently connected via the first communication scheme, and wherein the first user interface object is different from the displayed identification of the electronic apparatus.

13. The terminal apparatus of claim 1, wherein the first wireless communication scheme is Wi-Fi, and the second wireless communication scheme is Bluetooth.

14. The non-transitory computer-readable recording medium of claim 11, wherein the first wireless communication scheme is Wi-Fi, and the second wireless communication scheme is Bluetooth.

15. The display control method of claim 12, wherein the first wireless communication scheme is Wi-Fi, and the second wireless communication scheme is Bluetooth.

* * * * *